United States Patent
Choi

(10) Patent No.: US 12,128,953 B2
(45) Date of Patent: Oct. 29, 2024

(54) COWL CROSS BAR ASSEMBLY

(71) Applicant: HYUNDAI MOBIS Co., Ltd., Seoul (KR)

(72) Inventor: Ik Keun Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 537 days.

(21) Appl. No.: 17/137,120

(22) Filed: Dec. 29, 2020

(65) Prior Publication Data

US 2021/0354763 A1 Nov. 18, 2021

(30) Foreign Application Priority Data

May 15, 2020 (KR) .................. 10-2020-0058670

(51) Int. Cl.
*B62D 25/08* (2006.01)
*B62D 29/04* (2006.01)

(52) U.S. Cl.
CPC ......... *B62D 25/081* (2013.01); *B62D 29/041* (2013.01)

(58) Field of Classification Search
CPC .... B62D 25/081; B62D 29/041; B62D 65/00; B29C 45/14; B29C 63/06
USPC ................. 296/187; 264/241, 258, 257, 273
See application file for complete search history.

(56) References Cited

U.S. PATENT DOCUMENTS

| | | | | |
|---|---|---|---|---|
| 4,287,245 A * | 9/1981 | Kikuchi | ............... | F16L 59/024 428/317.5 |
| 6,305,430 B1 * | 10/2001 | Ishikawa | ............... | B62D 25/145 138/172 |
| 7,128,360 B2 * | 10/2006 | Scheib | ............... | B62D 29/004 296/70 |
| 8,801,087 B2 * | 8/2014 | Kim | ............... | B62D 25/145 296/29 |
| 8,919,855 B2 * | 12/2014 | Ruiz | ............... | B62D 25/145 296/70 |
| 9,493,192 B2 * | 11/2016 | Baudard | ............... | B62D 25/145 |
| 9,845,065 B2 * | 12/2017 | An | ............... | B60R 21/045 |
| 10,315,602 B2 * | 6/2019 | An | ............... | B60R 21/045 |
| 10,407,109 B2 * | 9/2019 | Kaneko | ............... | B62D 25/145 |
| 11,072,373 B2 * | 7/2021 | Hashimura | ............... | B62D 1/16 |
| 11,623,694 B2 * | 4/2023 | Choi | ............... | B62D 25/081 296/187.03 |
| 11,724,748 B2 * | 8/2023 | Richardson | ............... | B62D 25/145 296/193.02 |
| 11,753,081 B2 * | 9/2023 | Choi | ............... | B29C 45/1418 296/192 |
| 2004/0188158 A1 * | 9/2004 | Gebreselassie | ............... | B62D 25/14 180/89.1 |

(Continued)

FOREIGN PATENT DOCUMENTS

| | | | |
|---|---|---|---|
| CN | 103962767 A | * | 8/2014 |
| CN | 207106646 U | * | 3/2018 |

(Continued)

*Primary Examiner* — Hilary L Gutman
(74) *Attorney, Agent, or Firm* — NSIP Law

(57) ABSTRACT

A cowl cross bar assembly with a reduced weight and an increased stiffness. The cowl cross bar assembly includes a first pipe and a second pipe that are hollow and disposed laterally inside a chassis, a dash mounting member disposed between both ends of the first pipe, and a stiffener accommodated in an internal space of the dash mounting member and configured to absorb collision energy generated in a collision of a vehicle.

12 Claims, 26 Drawing Sheets

(56) References Cited

U.S. PATENT DOCUMENTS

| | | | | |
|---|---|---|---|---|
| 2010/0090451 A1* | 4/2010 | Atsumi | ................ | B62D 25/145 280/779 |
| 2011/0227369 A1* | 9/2011 | Abe | ................ | B62D 21/15 296/193.02 |
| 2011/0233964 A1* | 9/2011 | Matsutani | ............ | B62D 25/145 296/193.02 |
| 2013/0026798 A1* | 1/2013 | Meier | ................ | B62D 25/145 296/205 |
| 2013/0207370 A1* | 8/2013 | Gloden | ................ | B62D 1/195 280/779 |
| 2014/0001792 A1* | 1/2014 | Aoki | ................ | B62D 21/15 296/193.09 |
| 2014/0103685 A1* | 4/2014 | Mani | ................ | B62D 25/145 29/897.2 |
| 2014/0333094 A1* | 11/2014 | Matsushita | ............ | B62D 1/02 296/193.02 |
| 2015/0183469 A1* | 7/2015 | Kong | ................ | B62D 25/145 296/193.02 |
| 2015/0344080 A1* | 12/2015 | Davos | ................ | B62D 27/02 296/203.02 |
| 2016/0059900 A1* | 3/2016 | Eshima | ................ | B60R 21/206 296/187.09 |
| 2016/0200366 A1* | 7/2016 | Sanjo | ................ | B60K 35/50 296/70 |
| 2019/0016395 A1* | 1/2019 | Kajikawa | ................ | B62D 1/16 |
| 2020/0180700 A1* | 6/2020 | Kim | ................ | B62D 21/152 |
| 2020/0189661 A1* | 6/2020 | Kong | ................ | B62D 1/19 |

FOREIGN PATENT DOCUMENTS

| | | | | |
|---|---|---|---|---|
| JP | 08183462 A | * | 7/1996 | |
| JP | 2005306083 A | * | 11/2005 | |
| JP | 2012106517 A | * | 6/2012 | ........... B62D 25/145 |
| JP | 2014091421 A | * | 5/2014 | |
| JP | 2016068659 A | * | 5/2016 | |
| KR | 20040039822 A | * | 5/2004 | |
| KR | 20070025210 A | * | 3/2007 | |
| KR | 101718426 B1 | * | 3/2017 | |
| KR | 1754117 B1 | * | 7/2017 | ........... B62D 25/081 |
| KR | 10-2024776 | | 9/2019 | |
| KR | 20070051433 A | * | 5/2024 | |
| WO | WO-2015033642 A1 | * | 3/2015 | ............ B60K 37/04 |
| WO | WO-2015033836 A1 | * | 3/2015 | ............... B62D 1/16 |

* cited by examiner

COWL CROSS BAR ASSEMBLY

CROSS-REFERENCE TO RELATED APPLICATION

This application claims priority from and the benefit of Korean Patent Application No. 10-2020-0058670, filed on May 15, 2020, which is hereby incorporated by reference for all purposes as set forth herein.

BACKGROUND

Field

Embodiments disclosed herein relate to a cowl cross bar assembly, and more particularly, to a cowl cross bar assembly of which a weight may be reduced as well as increasing stiffness thereof.

Discussion of the Background

A cowl cross bar is one of a plurality of components making up an interior section, also referred to herein as a cockpit module, of a vehicle, and supports and guides electrical components of a cockpit such as a steering shaft, an instrument panel, an air-conditioning system, an airbag, a car audio system, and the like.

Also, the cowl cross bar corresponds to a frame configured to prevent or reduce a vehicle from being bent or distorted in a lateral direction such as in the case of an accident involving the vehicle and another vehicle or object, and in which the cowl cross bar is configured to improve durability of a chassis and protect safety of a passenger or passengers within the interior section of the vehicle when a vehicle collision occurs.

The cowl cross bar includes a pipe, pipe caps coupled to both ends of the pipe, side brackets coupled to the pipe caps to couple the pipe to both ends of the chassis, a pin member passing through the side bracket toward the chassis to guide a direction of coupling the chassis, a dash mounting member formed in a section between the both ends of the pipe and fastened to a dash panel, a center support formed in a section between the both ends of the pipe and coupled to a bottom of the chassis, and the like, occupying about 35 wt % the cockpit module. The cowl cross bar is manufactured through injection molding of metallic material such as steel and the like or a compound of aluminum, magnesium, plastic, and the like.

Since a general cowl cross bar assembly including metallic material such as steel and the like has high tensile strength and extension rate due to properties of the material thereof, it is possible to protect a passenger within the interior section of a vehicle by absorbing collision energy without cracking of the cowl cross bar assembly due to the properties of the material thereof. However, due to an excessive weight of a product in comparison to an injection-molded compound, such a general cowl cross bar assembly may result in a decrease in fuel efficiency when provided for an electrical vehicle and/or an eco-friendly vehicle. Particularly, since regulations on fuel efficiency have been tightened recently to reduce global warming, a cowl cross bar including metallic material such as steel and the like is inadequate for decreasing a weight of a vehicle so as to improve fuel efficiency of the vehicle.

Accordingly, due to the above limitation, a pipe and a dash mounting member including an injection-molded compound have been used recently.

However, a pipe and a dash mounting member of a cowl cross bar that include an injection-molded compound have a lighter weight in comparison to metallic material, but they also have a low extension rate. Accordingly, when extension occurs beyond the nominal extension rates of the material, damage occurs to the cowl cross bar.

Due to the above reasons, a method of increasing strength of a cowl cross bar while reducing a weight thereof has been sought. However, a satisfactory result has not been obtained so far.

The above information disclosed in this Background section is only for enhancement of understanding of the background of the invention and, therefore, it may contain information that does not constitute prior art.

SUMMARY

Embodiments disclosed herein are directed to solving the above problems. To solve these problems, a cowl cross bar assembly having a reduced weight as well as an increased stiffness thereof is provided.

According to an aspect of the present invention, there is provided a cowl cross bar assembly including a first pipe and a second pipe which are hollow and disposed laterally inside a chassis, a dash mounting member disposed between both ends of the first pipe, and a stiffener accommodated in an internal space of the dash mounting member and configured to absorb collision energy generated in a collision of a vehicle.

A stiffening plate formed of metallic material may be coupled to some surfaces of the dash mounting member.

The some surfaces of the dash mounting member may include a top surface and a front surface.

The dash mounting member may have a polyhedral shape.

The stiffener may have the same polyhedral shape as the dash mounting member.

The stiffener may include polypropylene, polyurethane, or a combination thereof.

According to another aspect of the present invention, there is provided a cowl cross bar assembly including a first pipe and a second pipe which are hollow and disposed laterally inside a chassis, a dash mounting member disposed between both ends of the pipe, and a stiffener configured to absorb collision energy generated in a collision of a vehicle. The dash mounting member surrounds a side surface of the stiffener.

The dash mounting member may have a band shape when viewed from above.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
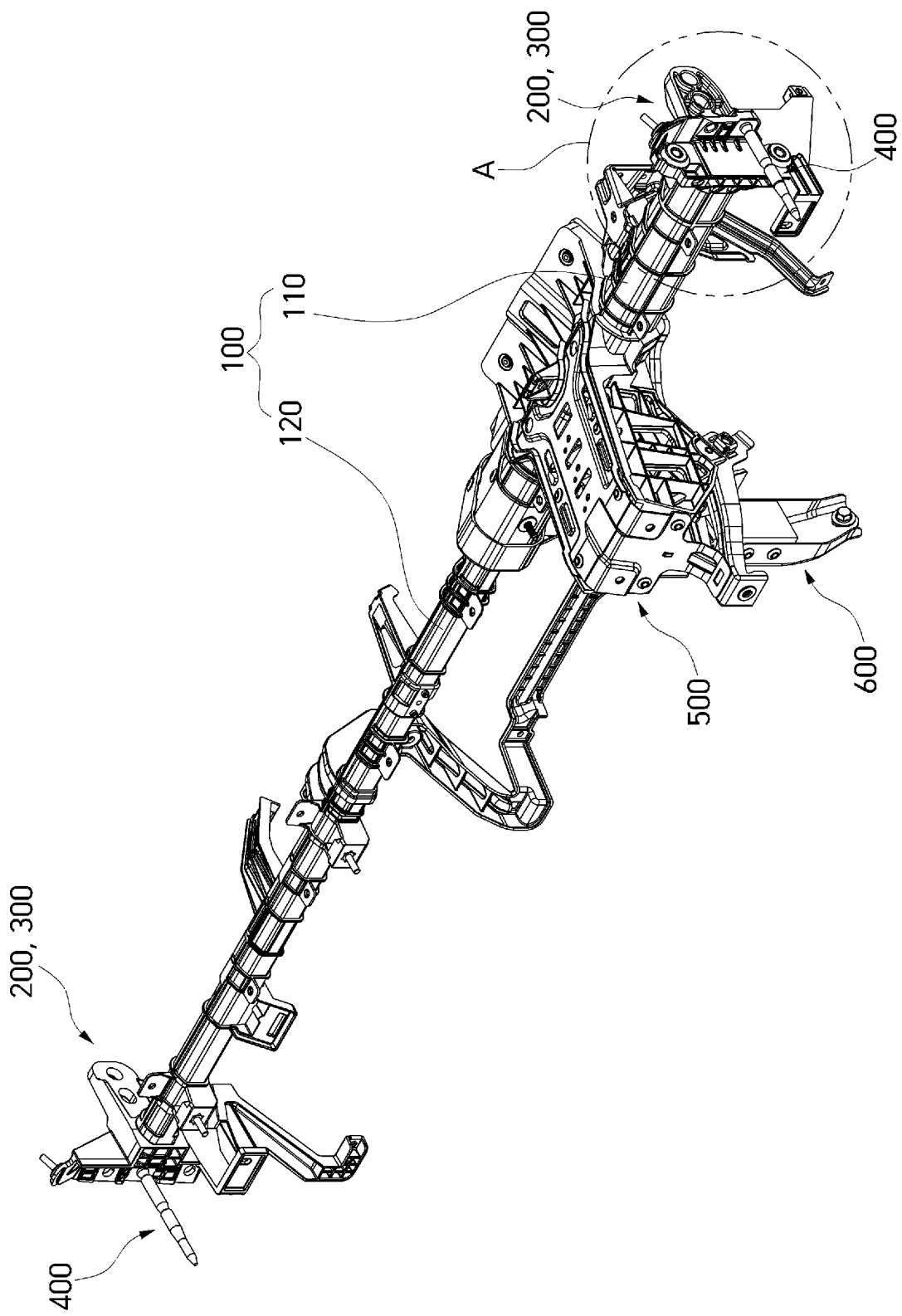
FIG. 1 is a perspective view showing a cowl cross bar assembly according to a first embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this description is thorough, and will fully convey the scope of the invention to those skilled in the art. Like reference numerals in the drawings denote like elements.

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims. Terms used herein are for the purpose of describing the embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Hereinafter, embodiments will be described in detail with reference to the accompanying drawings.

FIG. 1 is a perspective view showing a cowl cross bar assembly according to a first embodiment.

Referring to FIG. 1, the cowl cross bar assembly according to the first embodiment is configured to be fixed to a side portion and a dash panel of a chassis of a vehicle and is formed using compound plastic mixed with carbon fiber, glass fiber, or the like, an aluminum or magnesium alloy, or the like that has a relatively lighter weight than metallic material, so that an overall weight of the cowl cross bar assembly may be reduced and strength thereof may be increased.

The cowl cross bar assembly according to the first embodiment includes a pipe 100 disposed in a lateral direction in a chassis, pipe caps 200 fitting on both ends of the pipe 100, side brackets 300 coupled to the pipe caps 200 through insert-injection molding, pin members 400 coupled to the side brackets 300, a dash mounting member 500 fixed to the pipe, and a center support 600.

Figure 2:
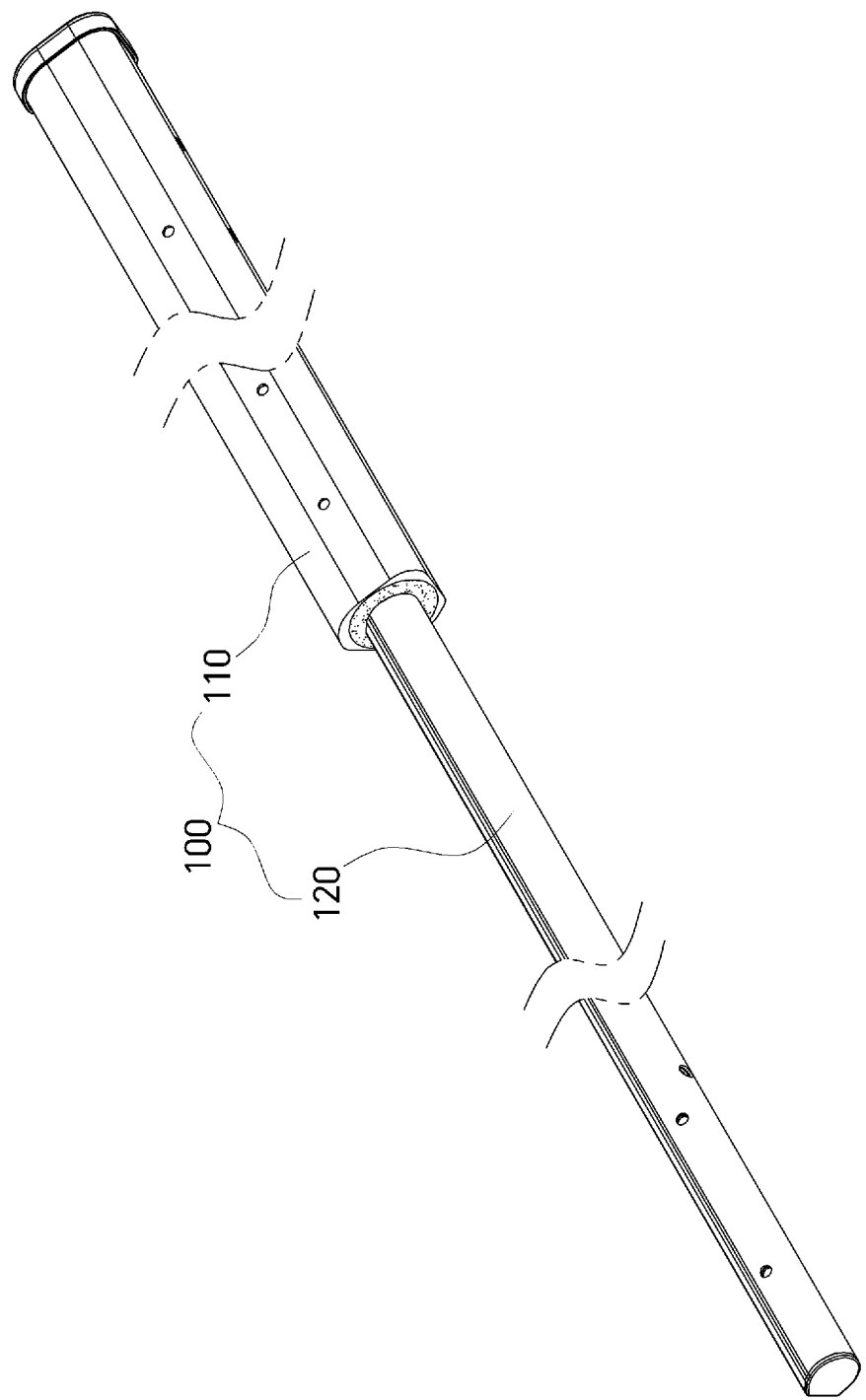
FIG. 2 is a perspective view showing a pipe of the cowl cross bar assembly according to the first embodiment.

FIG. 2 is a perspective view showing the pipe of the cowl cross bar assembly according to the first embodiment.

The pipe 100 is fixed to an inner surface of the chassis and traverses a driver's seat and a front passenger's seat inside a vehicle.

The pipe 100 is formed of a long hollow pipe.

Since the pipe 100 is formed of an injection-molded compound, an overall weight of the cowl cross bar assembly may be reduced in comparison to a cowl cross bar assembly including metallic material.

The pipe 100 includes a first pipe 110 and a second pipe 120.

The first pipe 110 is a section corresponding to the driver's seat on the basis of a middle section among all sections of the pipe 100.

The second pipe 120 is a section corresponding to the front passenger's seat on the basis of the middle section among all sections of the pipe 100.

Accordingly, the first pipe 110 and the second pipe 120 have a shape extending in a lateral direction of the chassis.

Figure 3:
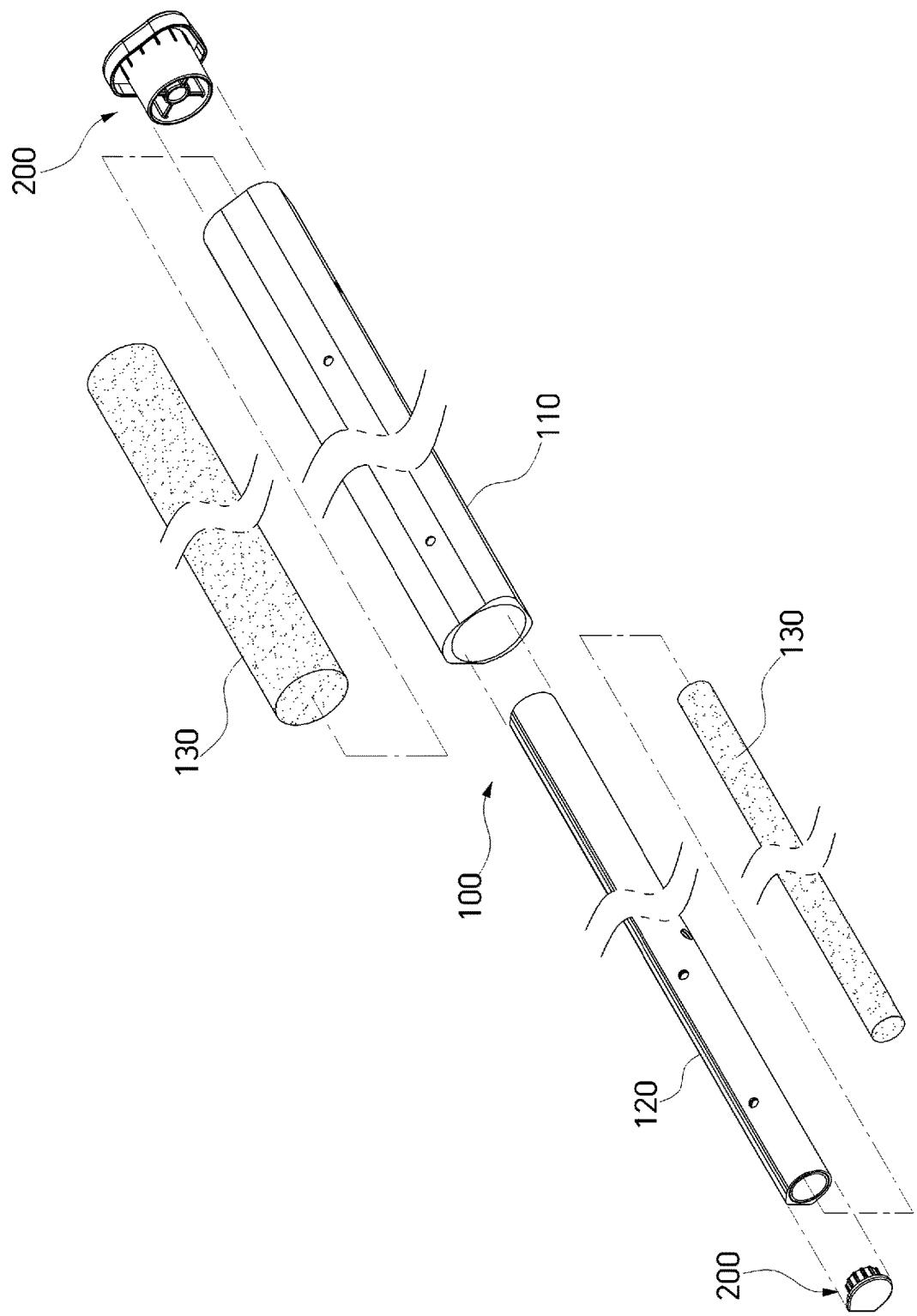
FIG. 3 is an exploded perspective view showing the pipe and a pipe stiffener of the cowl cross bar assembly according to the first embodiment.

A pipe stiffener 130 is disposed in the first pipe 110 and the second pipe 120 included in the pipe 100, as shown in FIG. 3, which is an exploded perspective view showing the pipe and the pipe stiffener of the cowl cross bar assembly according to the first embodiment.

Referring to FIG. 3, a pair of such pipe stiffeners 130 are inserted into the first pipe 110 and the second pipe 120, each of which has a hollow shape.

The pipe stiffeners 130 are formed of energy-absorbing foam.

Cross sections of the pipe stiffener 130 have the same shapes as those of cross sections of the first pipe 110 and the second pipe 120 (shown as circular shapes in FIG. 3, whereas other shapes may be envisioned while remaining within the scope of the invention as set forth herein).

Accordingly, the pipe stiffeners 130 have the same bar shapes as those of the first pipe 110 and the second pipe 120.

Also, the pipe caps 200 are inserted into inner circumferential surfaces of ends of the first pipe 110 and the second pipe 120.

Accordingly, to form clearances in the ends of the pipe 100 into which the pipe caps 200 are inserted, lengths of the pipe stiffeners 130 are formed to be shorter than lengths of the first pipe 110 and the second pipe 120.

That is, the clearances are formed in the ends of the first pipe 110 and the second pipe 120 into which the pipe stiffeners 130 are inserted so that the pipe caps 200 may be easily inserted into the clearances.

The pipe stiffeners 130 include an injection-molded compound formed of energy-absorbing foam, for example, polypropylene or polyurethane or a combination thereof.

Accordingly, due to properties of material, the pipe stiffeners 130 absorb collision energy that acts on the pipe 100 when a collision due to a vehicle accident occurs.

Also, the pipe stiffeners 130 may minimize the collision energy transferred to the pipe 100 so as to reduce deformation of the pipe 100 and to prevent or reduce the pipe 100 from being damaged.

Accordingly, the pipe stiffeners 130 may secure stiffness of the pipe 100 against the collision energy.

Also, cross-sectional shapes of outer circumferential surfaces of the first pipe 110 and the second pipe 120 may be of an irregular shape, such as a non-circular shape like a triangular shape or quadrangular shape.

Accordingly, a variety of components fixed to the first pipe 110 and the second pipe 120 may be prevented or reduced from being easily rotated from the first pipe 110 and the second pipe 120.

Cross-sectional shapes of the inner circumferential surfaces of the first pipe 110 and the second pipe 120 may be a variety of shapes such as a circular shape, a polygonal shape such as a triangular shape, a quadrangular shape, and the like, and an irregular shape in order to achieve a purpose of increasing stiffness of the pipe stiffeners 130 disposed inside the first pipe 110 and the second pipe 120.

Also, a plurality of pipe stiffeners 130 according to another embodiment may be provided.

Hereinafter, pipe stiffeners of a cowl cross bar assembly according to another embodiment will be described below in detail.

Figure 4:
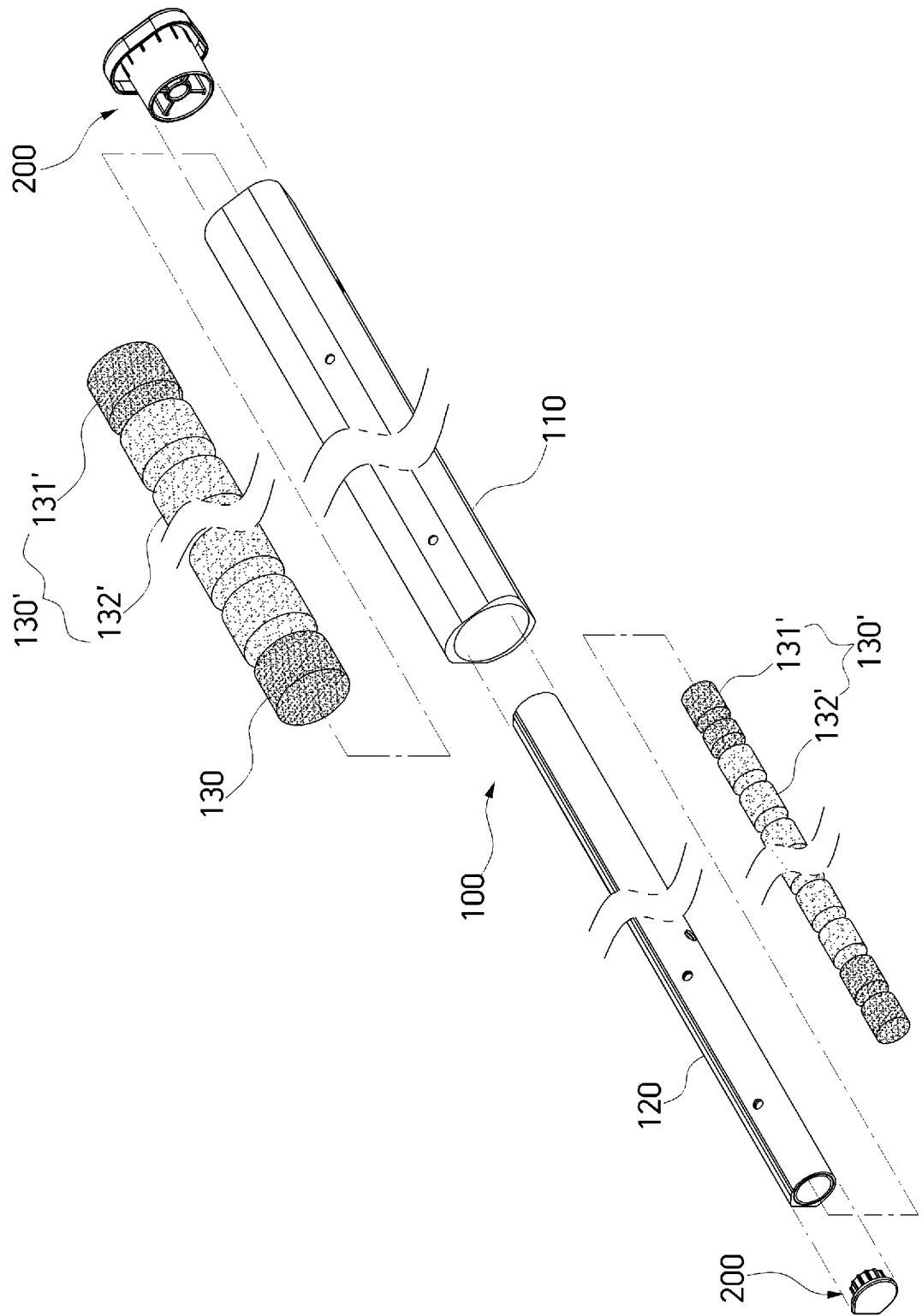
FIG. 4 is an exploded perspective view showing a pipe and pipe stiffeners according to another embodiment.

FIG. 4 is an exploded perspective view showing a pipe and pipe stiffeners according to another embodiment.

Components equal to those described in the above embodiment will be referred to as the same reference numerals, and a detailed description thereof will be omitted for sake of brevity.

Referring to FIG. 4, a plurality of pipe stiffeners 130' according to another embodiment include energy-absorbing foam having different levels of stiffness for a section that needs stiffness and a section that needs flexibility rather than stiffness.

For example, pipe stiffeners 131' using a relatively large amount of injection-molded compound may be inserted into sections at one ends of the first pipe 110 and the second pipe 120 that are respectively fixed to left and right sides of the chassis and need stiffness.

Also, pipe stiffeners 132' using a relatively smaller amount of injection-molded compound may be inserted into middle sections of the first pipe 110 and the second pipe 120 that need flexibility rather than stiffness.

Accordingly, a plurality of pipe stiffeners 131' and 132' having different levels of stiffness are inserted into the first pipe 110 and the second pipe 120.

Accordingly, the plurality of pipe stiffeners 130' having different levels of stiffness may easily adjust sections for stiffness and sections for flexibility in the pipe 100.

Also, the plurality of pipe stiffeners 130' having different levels of stiffness may reduce consumption of a large amount of injection-molded compound so as to reduce manufacturing costs of the pipe stiffeners 130'.

Also, one ends of the first pipe 110 and the second pipe 120, which are respectively fixed to left and right sides of the chassis, and the middle section to which the center support 600 is coupled, need to have stiffness to minimize deformation of the pipe 100 when an accident due to a collision of the vehicle occurs.

Further, in a section of the first pipe 110 to which the dash mounting member 500 is fixed, the first pipe 110 needs to be capable of absorbing collision energy.

Accordingly, among sections of the first pipe 110 and the second pipe 120, stiffness of the pipe should differ according to a section fixed to the chassis and a section that receives collision energy directly from the outside.

To this end, a winding material 140 is wound around a circumferential surface of the pipe 100 according to one or more embodiments.

That is, in the pipe 100 according to one or more embodiments, the stiffness of the pipe 100 may be adjusted for each section that needs stiffness and for each section that needs flexibility, rather than stiffness in the whole section of the pipe 100, through a winding process of winding the winding material 140.

Figure 5:
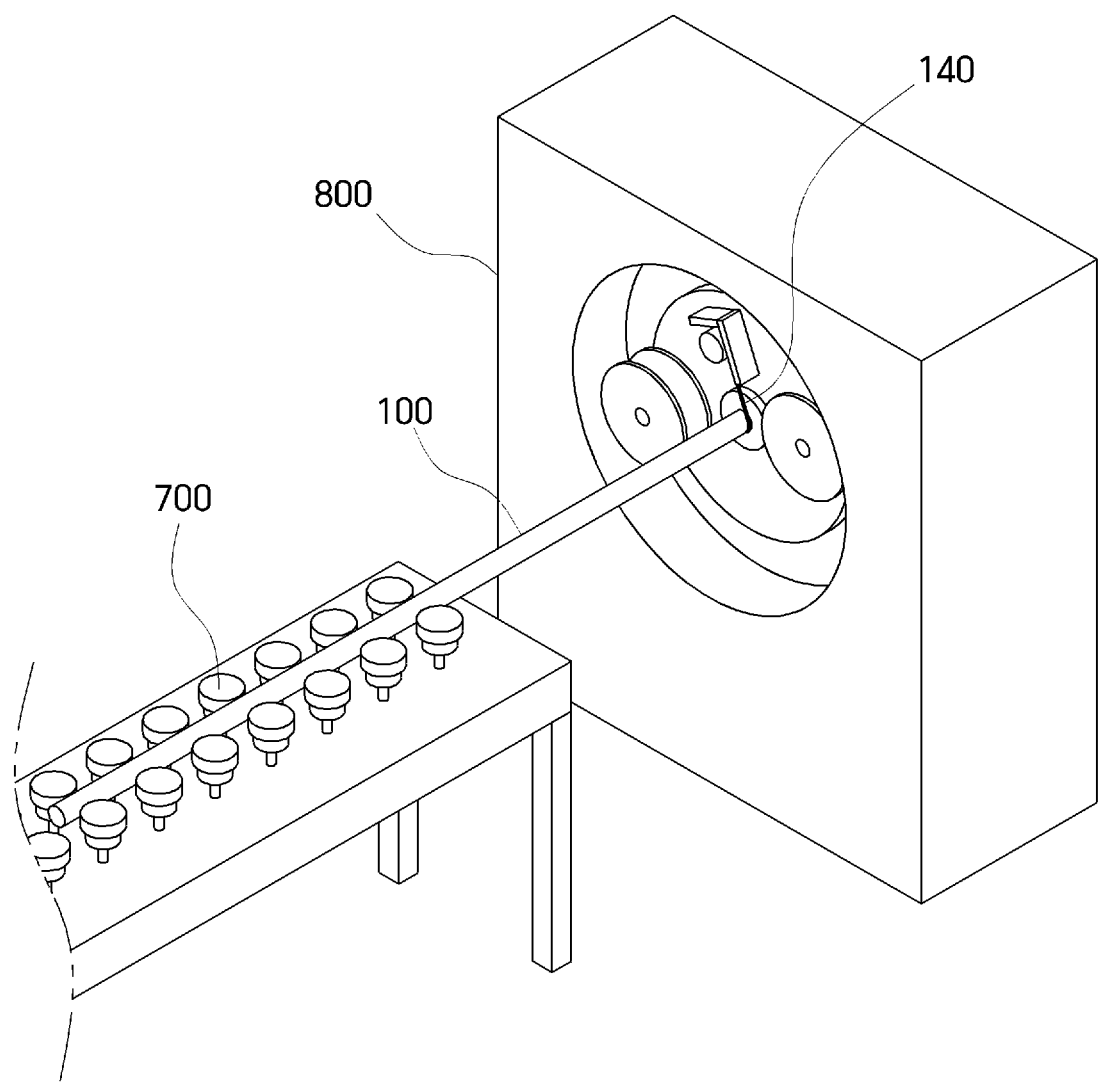
FIG. 5 is a reference view showing a transfer device and a winding device according to the first embodiment.

FIG. 5 is a reference view showing a transfer device and a winding device according to the first embodiment of the present invention.

Referring to FIG. 5, the winding material 140 according to the first embodiment s wound around the pipe 100, that is, all sections of the first pipe 110 and the second pipe 120 with different winding ratios (winding intervals) around a surface of the section that needs stiffness and a surface of the section that needs flexibility.

The winding material 140 may include an injection-molded compound, for example, continuous fiber reinforced thermoplastic compound (CFT), polypropylene, polyurethane, or a combination thereof.

The winding material 140 includes a first winding material 141 and a second winding material 142.

The first winding material 141 is wound around the surfaces of the sections of the first pipe 110 and the second pipe 120, which need stiffness, at a first winding speed by a winding device 800.

Also, the second winding material 142 is wound around the surfaces of the sections of the first pipe 110 and the second pipe 120, which need flexibility, at a second winding speed lower than the first winding speed by the winding device 800.

Accordingly, the winding material 140 may adjust the stiffness of the pipe 100 according to the first winding material 141 and the second winding material 142.

Here, the section of the first pipe 110 that needs stiffness includes sections adjacent to the section to which the dash mounting member 500 is coupled, that is, sections in which the side bracket 300 and the center support 600 are disposed in all the sections of the first pipe 110, and the section that needs flexibility is the section to which the dash mounting member 500 is coupled in all the sections of the first pipe 110.

Also, the section of the second pipe 120 that needs stiffness includes sections in which the side bracket 300 and the center support 600 are disposed in all the sections of the second pipe 120, and the section that needs flexibility is a middle section in all the sections of the second pipe 120.

Hereinafter, a method of manufacturing the pipe 100 of the cowl cross bar assembly according to the first embodiment of will be described in detail with reference to the drawings.

Figure 6:
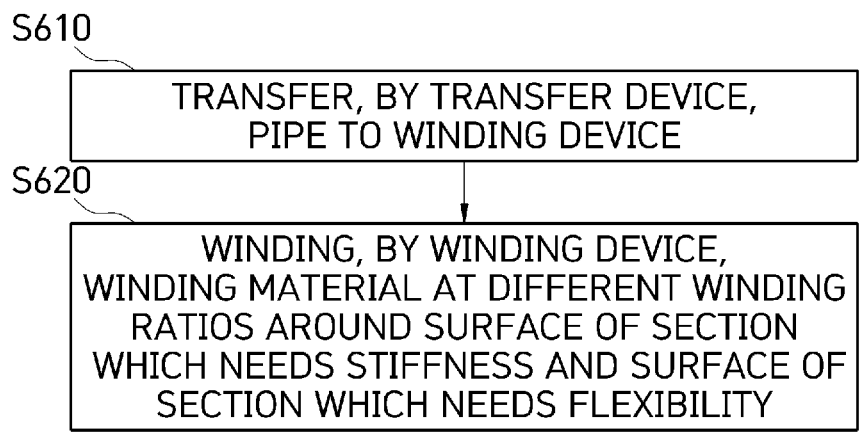
FIG. 6 is a flowchart showing a method of manufacturing the pipe of the cowl cross bar assembly according to the first embodiment.
Figure 7:
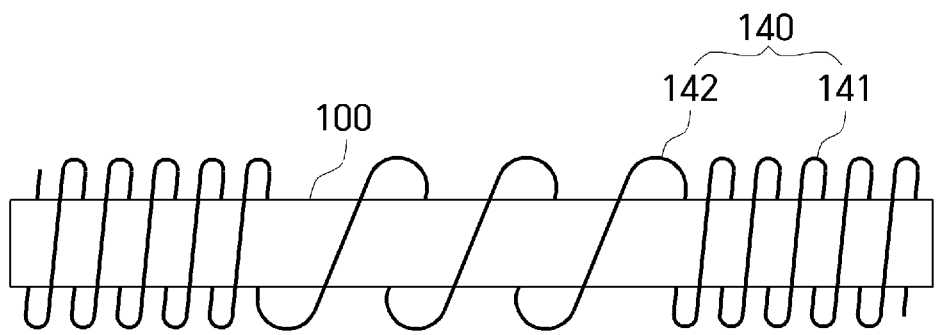
FIG. 7 is a schematic diagram showing a state in which a winding material is wound around the pipe according to the first embodiment.

FIG. 6 is a flowchart showing a method of manufacturing the pipe of the cowl cross bar assembly according to the first embodiment, and FIG. 7 is a schematic diagram showing a state in which the winding material 140 is wound around the pipe according to the first embodiment.

With reference to FIG. 6, in the method of manufacturing the pipe 100 according to the first embodiment, the first pipe 110 or the second pipe 120 is mounted on a transfer device 700 that moves horizontally at a constant speed, and the transfer device 700 moves the first pipe 110 or the second pipe 120 disposed in a lateral direction inside the chassis to the winding device 800 (S610).

Here, the transfer device 700, which transfers the first pipe 110 or the second pipe 120, may maintain the same (i.e., constant) moving speed.

Subsequently, when the transfer device 700 reaches the winding device 800 at a certain speed, the winding device 800 winds the winding material 140 around the surfaces of the sections that need stiffness and the surfaces of the sections that need flexibility in all the sections of the first pipe 110 or the second pipe 120 at different winding ratios (S620).

Here, in the winding, by the winding device 800, the winding material 140 is wound around the surface of the section that needs stiffness at a first winding ratio and wound around the surface of the section that needs flexibility at a second ratio lower than the first winding ratio.

Also, in the winding, the winding material 140 is wound at the first winding ratio in the sections adjacent to the section to which the dash mounting member 500 is coupled, that is, in the sections to which the side bracket 300 and the center support 600 are coupled, and the winding material 140 is wound at the second winding ratio lower than the first winding ratio in the section to which the dash mounting member 500 is coupled in all the sections of the first pipe 110.

Also, in the winding, the winding material 140 is wound at the first winding ratio where the side bracket 300 and the center support 600 are coupled, and the winding material 140 is wound at the second winding ratio lower than the first winding ratio in the middle section in all the sections of the second pipe 120.

Also, in the winding, by the winding device 800, the winding material 140 is wound around the surface of the section that needs stiffness at a first winding speed, and wound around the surface of the section that needs flexibility at a second winding speed lower than the first winding speed.

That is, as shown in FIG. 7, at the first winding speed, the winding material 140 is wound, at small intervals, around the surfaces of the sections that need stiffness. Also, at the second winding speed, the winding material 140 is wound, at large intervals, around the surface of the section that needs flexibility.

Accordingly, as described above, the sections of the first pipe 110 and the second pipe 120 that need stiffness are the sections in which the side brackets 300 and the center support 600 are disposed in all the sections of the first pipe 110 and the second pipe 120.

The sections of the first pipe 110 and the second pipe 120 that need flexibility are the section in all the sections of the first pipe 110 to which the dash mounting member 500 is coupled and the middle section in all the sections of the second pipe 120.

Accordingly, according to the winding ratio and the winding speed of the winding material 140, the sections of the first pipe 110 in which the side bracket 300 and the center support 600 are disposed may have higher stiffness in comparison to the section to which the dash mounting member 500 is coupled. The section to which the dash mounting member 500 is coupled and the middle section may have higher flexibility in comparison to the sections in which the side bracket 300 and the center support 600 are disposed.

Further, in the winding, the transfer device 700 transmits position data including start positions and end positions of the sections that need stiffness and position data including start positions and end positions of the sections that need flexibility in all the sections of the pipe 100 to the winding device 800.

Also, the winding device 800 winds the winding material 140 around the surfaces of the sections that need stiffness and the sections that need flexibility according to the position data received from the transfer device 700.

That is, the winding device 800 may wind while easily distinguishing the sections that need stiffness and the sections that need flexibility in all the sections of the first pipe 110.

Hereinafter, a method of manufacturing the pipe 100 of the cowl cross bar assembly according to another embodiment will be described in detail with reference to the attached drawings.

Figure 8:
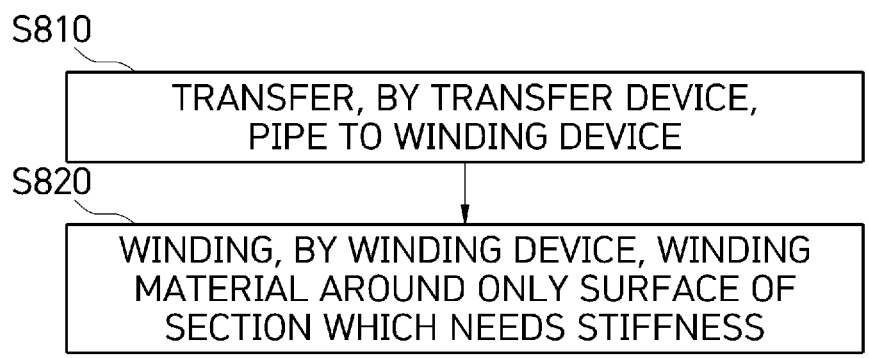
FIG. 8 is a flowchart showing a method of manufacturing the pipe of the cowl cross bar assembly according to another embodiment.
Figure 9:
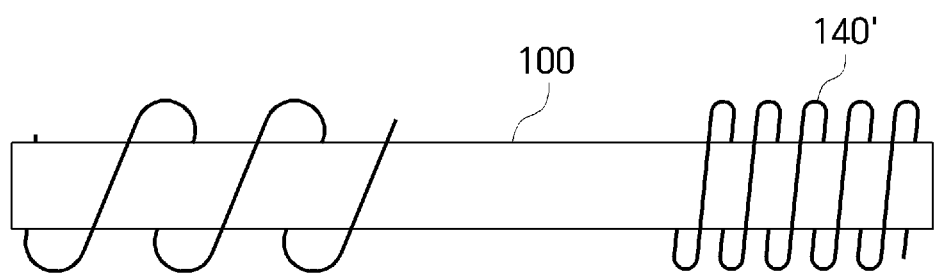
FIG. 9 is a schematic diagram showing a state in which a winding material is wound around the pipe according to another embodiment.
Figure 10:
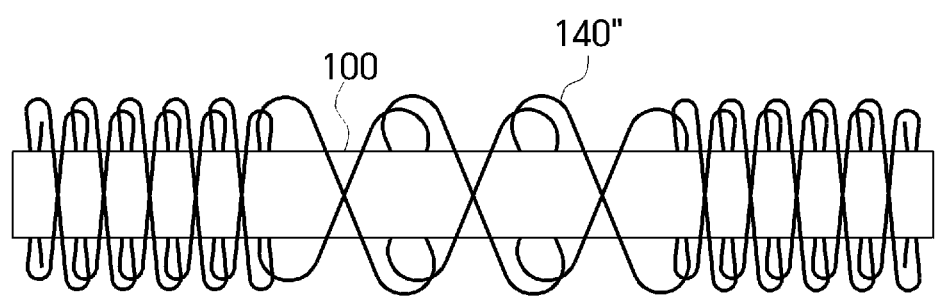
FIG. 10 is a schematic diagram showing a state in which a winding material is wound around a pipe according to still another embodiment.

FIG. 8 is a flowchart showing a method of manufacturing the pipe of the cowl cross bar assembly according to another embodiment, FIG. 9 is a schematic diagram showing a state in which a winding material is wound around the pipe according to another embodiment, and FIG. 10 is a schematic diagram showing a state in which a winding material is wound around a pipe according to still another embodiment.

Referring to FIG. 8, in the method of manufacturing the pipe 100 according to the first embodiment, in step S810, the pipe 100, that is, the first pipe 110 or the second pipe 120, is mounted on the transfer device 700 that moves horizontally at a constant speed, and the transfer device 700 moves the first pipe 110 or the second pipe 120 disposed in a lateral direction inside the chassis to the winding device 800.

Subsequently, when the transfer device 700 reaches the winding device 800 at a certain speed, in step S820, the winding device 800 winds a winding material 140' around only the surfaces of the sections that need stiffness in all the sections of the first pipe 110 or the second pipe 120.

Here, the sections that need stiffness are sections in all the sections of the first pipe 110 and the second pipe 120 in which the side brackets 300 and the center support 600 are disposed.

Also, the winding device 800 winds the winding material 140' around only the surfaces of the sections that need stiffness according to the position data received from the transfer device 700.

Also, in the winding, the winding device 800 may wind the winding material 140' around a surface of at least one section in a plurality of sections that need stiffness at a first winding ratio or a second winding ratio lower than the first winding ratio.

For example, as shown in FIG. 9, according to a service environment, winding may be omitted in some sections of all the sections of the first pipe 110 and the second pipe 120 that need flexibility and winding may be performed in only the sections that need stiffness.

Accordingly, the winding device 800 may easily adjust the sections that need stiffness and the sections that need flexibility in the first pipe 110 and the second pipe 120 and may reduce manufacturing costs for winding of the pipe 100 by preventing unnecessary use of the winding material 140'.

In the winding, the transfer device 700 transmits position data including start positions and end positions of the sections that need stiffness in all the sections of the pipe 100 to the winding device.

Also, as shown in FIG. 10, the transfer device 700 may reciprocate in all the sections of the pipe 100 to form a plurality of layers of a winding material 140" wound around the surface of the pipe 100.

Accordingly, the sections of the pipe 100 in which the side brackets 300 and the center support 600 are disposed may formed having a relatively higher stiffness.

Figure 11:
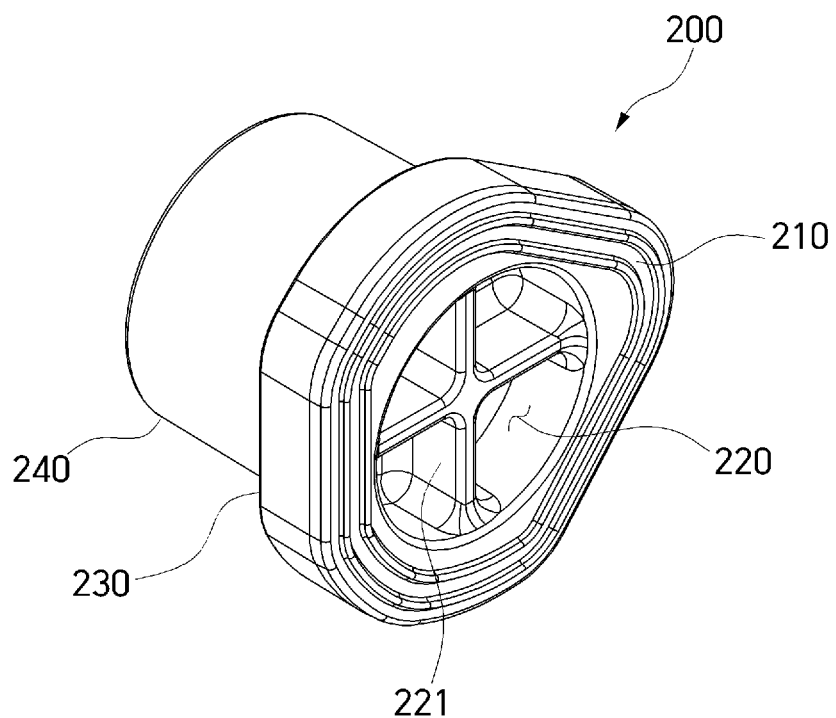
FIGS. 11 and 12 are perspective views showing a pipe cap of the cowl cross bar assembly according to the first embodiment.
Figure 12:
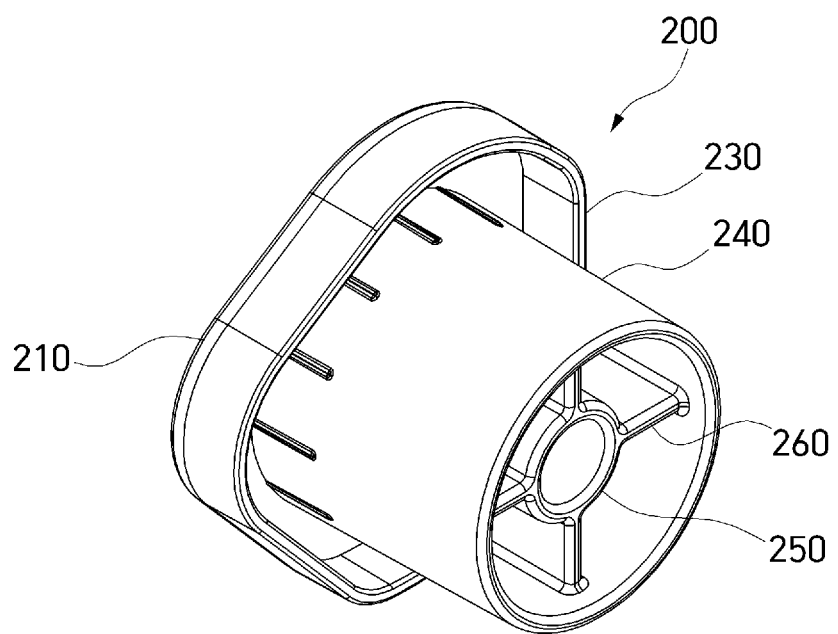
Figure 13:
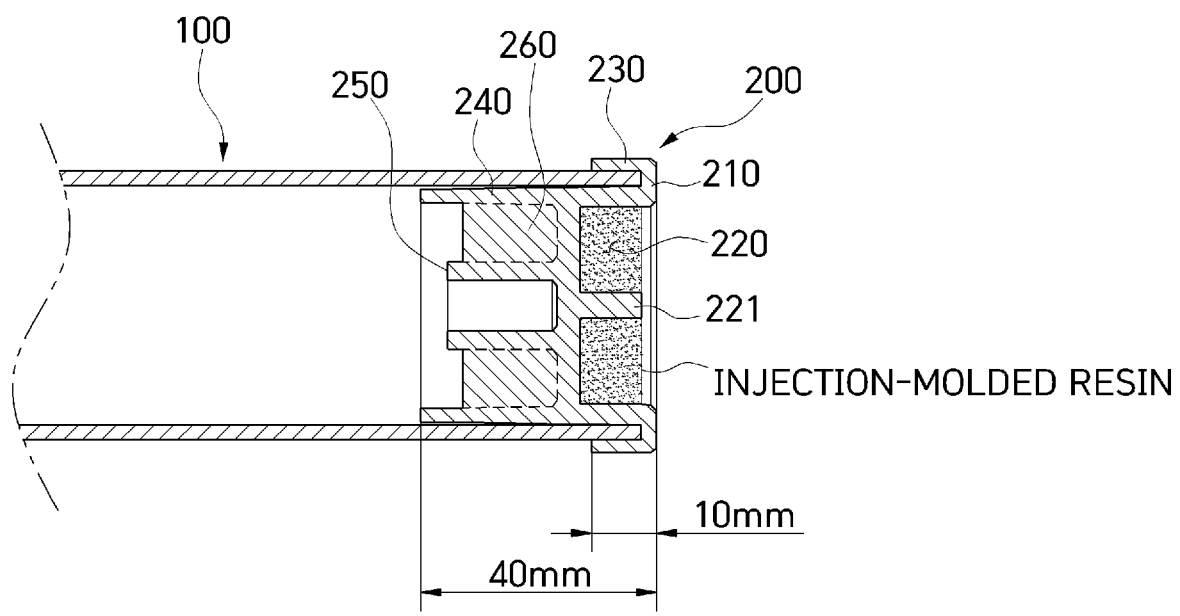
FIG. 13 is a coupling cross-sectional view showing the pipe cap and the pipe of the cowl cross bar assembly according to the first embodiment.

FIGS. 11 and 12 are perspective views showing the pipe cap of the cowl cross bar assembly according to the first embodiment, and FIG. 13 is a coupling cross-sectional view showing the pipe cap and the pipe of the cowl cross bar assembly according to the first embodiment.

Referring to FIGS. 11 to 13, the pipe cap 200 according to the first embodiment includes a combination of polyamide and glass fiber or a combination of polypropylene and glass fiber.

A pair of such pipe caps 200 are coupled to one ends of the first pipe 110 and the second pipe 120 through an insert-injection molding method.

The pipe caps 200 performs hydroforming on an inside of the pipe 100 using water pressure when the pipe 100 is injection-molded so as to block injection-molded resin from flowing into a center, that is, an empty space of the pipe 100 including a hollow shaft.

Also, the pipe caps 200 prevent or reduce regions coupled to the first pipe 110 and the second pipe 120 from being damaged by collision energy.

The pipe caps 200 each include a head portion 210, a concave portion 220, a first extension portion 230, a second extension portion 240, a third extension portion 250, and an internal support portion 260.

Hereinafter, the pipe cap 200 disposed on one end of the first pipe 110 will be described.

The head portion 210 is disposed on one surface of the first pipe 110 and may have the same shape as the cross-sectional shape of the first pipe 110.

The head portion 210 comes into contact with a side surface of the first pipe 110 and seals the one end of the first pipe 110.

That is, the head portion 210 has an area greater than a cross-sectional area of the first pipe 110.

Accordingly, the head portion 210 may shield the entire side surface of the first pipe 110 so as to effectively block an injection-molded resin from flowing into the first pipe 110.

The concave portion 220 is formed to have a groove recessed from a side surface of the head portion 210 in an axial direction.

The concave portion 220 may be formed to be recessed at the same depth as a thickness of the head portion 210.

The concave portion 220 is filled with an injection-molded resin.

Accordingly, the concave portion 220 may increase stiffness by increasing a cross-sectional area of injection molding of the first pipe 100 when the first pipe 100 is injection molded.

A rib 221 is formed in the concave portion 220.

The rib 221 may be formed to have a cross (+) shape.

The rib 221 is formed to have a length equal to the depth of the concave portion 220 or shorter than the depth of the concave portion 220.

The rib 221 may effectively prevent the injection-molded resin from being separated from the concave portion 220 by increasing a contact area of the injection-molded resin that fills the concave portion 220.

The first extension portion 230 extends along a perimeter of the head portion 210 in a direction, in which the first pipe 110 is disposed, and covers an outer circumferential surface of the one end of the first pipe 110.

A cross-sectional shape of the first extension portion 230 has the same shape as the cross-sectional shape of the first pipe 110.

The second extension portion 240 extends from the head portion 210 in the direction in which the first pipe 110 is disposed and is spaced at a distance apart from the first extension portion 230 toward a center.

Preferably, the second extension portion 240 is spaced at a distance, which is as long as a thickness of the first pipe 110, apart from the first extension portion 230.

A cross-sectional shape of the second extension portion 240 has the same shape as the cross-sectional shape of the first pipe 110.

Accordingly, an inner circumferential surface of the first extension portion 230 comes into contact with the outer circumferential surface of the one end of the first pipe 110, and an outer circumferential surface of the second extension portion 240 comes into contact with an inner circumferential surface of the one end of the first pipe 110.

The second extension portion 240 extends to be longer than the first extension portion 230.

Preferably, a length of the first extension portion 230 is 10 mm, and a length of the second extension portion 240 is 40 mm.

Accordingly, the second extension portion 240 supports the one end of the first pipe 110 by as much as an extended length of the second extension portion 240 when a collision accident of the vehicle occurs.

Accordingly, the second extension portion 240 may increase stiffness of an area of the one end of the first pipe 110 by absorbing collision energy transferred to the one end of the first pipe 110 coupled through insert-injection molding.

A third extension portion 250 extends from the head portion 210 in the direction in which the first pipe 110 is disposed and is spaced at a distance apart from the second extension portion 240 toward the center.

The third extension portion 250 extends less than the length of the second extension portion 240.

An internal support portion 260 is disposed between the second extension portion 340 and the third extension portion 250.

At least three to eight internal support portions 260 are disposed to be spaced at distances apart along an outer circumferential surface of the third extension portion 250.

A plurality of internal support portions 260 have a radial shape connecting an inner circumferential surface of the second extension portion 240 to the outer circumferential surface of the third extension portion 250.

Accordingly, the third extension portion 250 and the internal support portions 260 support the second extension portion 240 that supports the one end of the first pipe 110.

Accordingly, the third extension portion 250 and the internal support portions 260 may more firmly support the one end of the first pipe 110 configured to absorb collision energy transferred to the first pipe 110 so as to further increase stiffness of the area of the one end of the first pipe 110.

According to another embodiment, the first extension portion and the second extension portion may extend by the same length.

Hereinafter, pipe caps of the cowl cross bar assembly according to another embodiment will be described below in detail.

Figure 14:
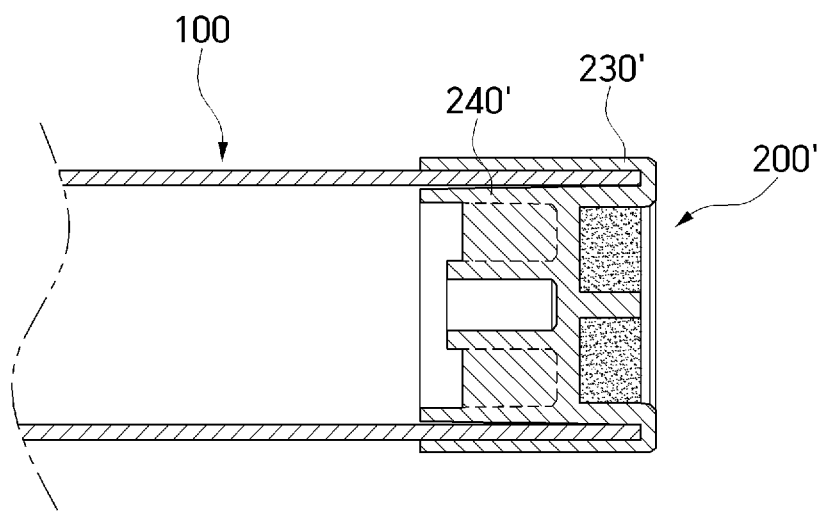
FIG. 14 is a coupling cross-sectional view showing a pipe cap and the pipe of the cowl cross bar assembly according to another embodiment.

FIG. 14 is a coupling cross-sectional view showing a pipe cap and the pipe of the cowl cross bar assembly according to another embodiment.

Components equal to those described in the above embodiment will be referred to as the same reference numerals, and a detailed description thereof will be omitted for sake of brevity.

An inner circumferential surface of a first extension portion 230' included in a pipe cap 200' comes into contact with the outer circumferential surface of the one end of the first pipe 110, and an outer circumferential surface of a second extension portion 240' included in the pipe cap 200' comes into contact with the inner circumferential surface of the one end of the first pipe 110.

Accordingly, the second extension portion 240' supports the one end of the first pipe 110 as much as extended lengths of the first extension portion 230' and the second extension portion 240' when a collision accident of the vehicle occurs.

Accordingly, the second extension portion 240' may increase stiffness of both ends of the pipe 100 by absorbing collision energy transferred to the pipe 100 coupled through insert-injection molding.

Thus, since the first extension portion 230' and the second extension portion 240' doubly support the collision energy transferred to the pipe 100 coupled through insert-injection molding, the stiffness at both ends of the pipe 100 may be further increased.

Since the pipe cap 200 coupled to the other end of the second pipe 120 also has similar components to those of the pipe cap 200 coupled to the one end of the first pipe 110, a detailed description of the pipe cap 200 coupled to the other end of the second pipe 120 will be omitted for sake of brevity.

Figure 15:
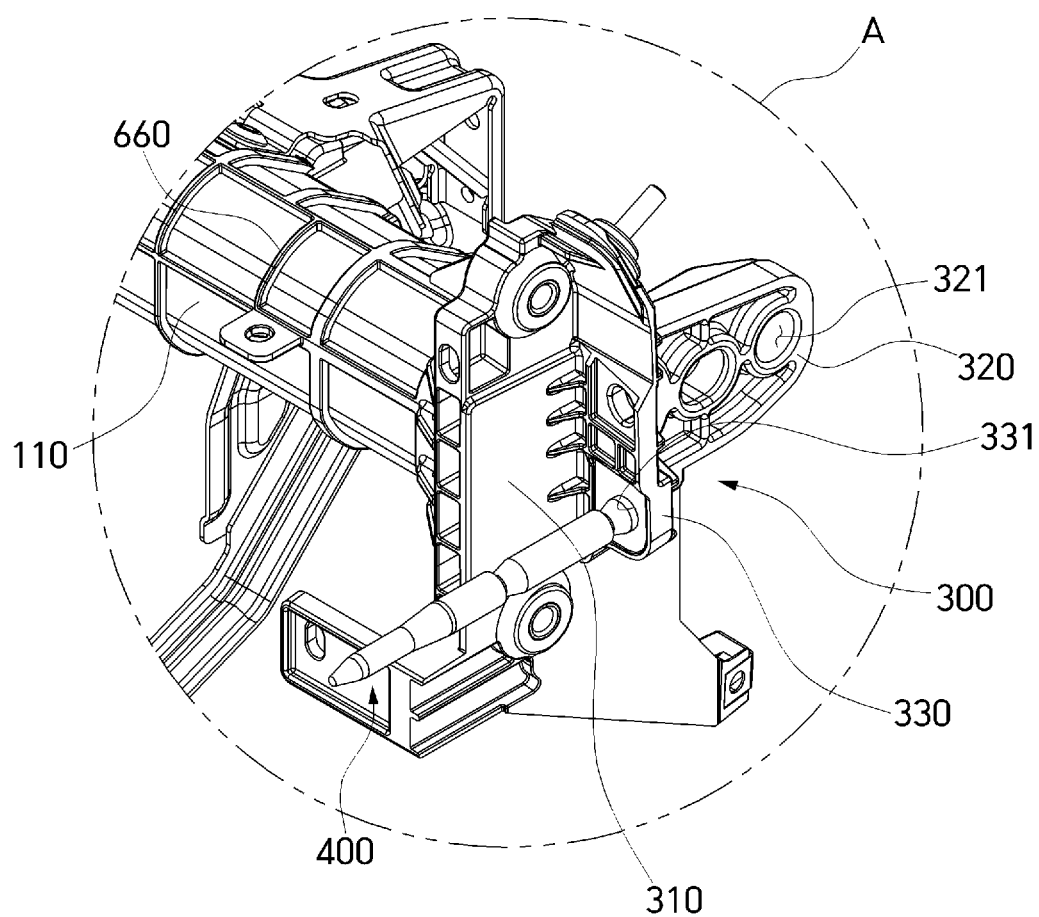
FIG. 15 is an enlarged view showing part A shown in FIG. 1.

FIG. 15 is an enlarged view showing part A shown in FIG. 1.

Referring to FIG. 15, the side brackets 300 according to the first embodiment include polypropylene and glass fiber.

The pair of such side brackets 300 are disposed on one ends of the first pipe 110 and the second pipe 120 and are coupled to the pipe caps 200 through a mutual insert-injection molding method.

The side brackets 300 are directly fixed in a lateral direction of the chassis.

The side brackets 300 each include a main frame 310, a lifting frame 320, and a bent frame 330.

The main frame 310 comes into contact with an outer surface of the pipe cap 200 and is coupled to the pipe cap 200 through a mutual insert-injection molding method.

The lifting frame 320 extends from the main frame 310 toward a rear of the vehicle.

Since a variety of electrical components are all assembled, the cowl cross bar assembly is heavy and is lifted using equipment such as a robot arm (not shown) to be inserted into an assembly line of a vehicle.

The lifting frame 320 includes one or more insertion grooves 321.

The robot arm configured to lift the cowl cross bar assembly is coupled to the insertion grooves 321 of the lifting frame 320.

Accordingly, the lifting frame 320 is coupled to the robot arm through the insertion grooves 321 for the robot arm to lift the cowl cross bar assembly.

The bent frame 330 is bent from the main frame 310 in a direction of intersection with the other and includes a coupling groove 331.

The pin member 400 is coupled to the coupling groove 331, and the cowl cross bar assembly according to one of more embodiments, that is, the pipe 100 and the side bracket 300, may be easily mounted on the chassis by the pin member 400.

Figure 16:
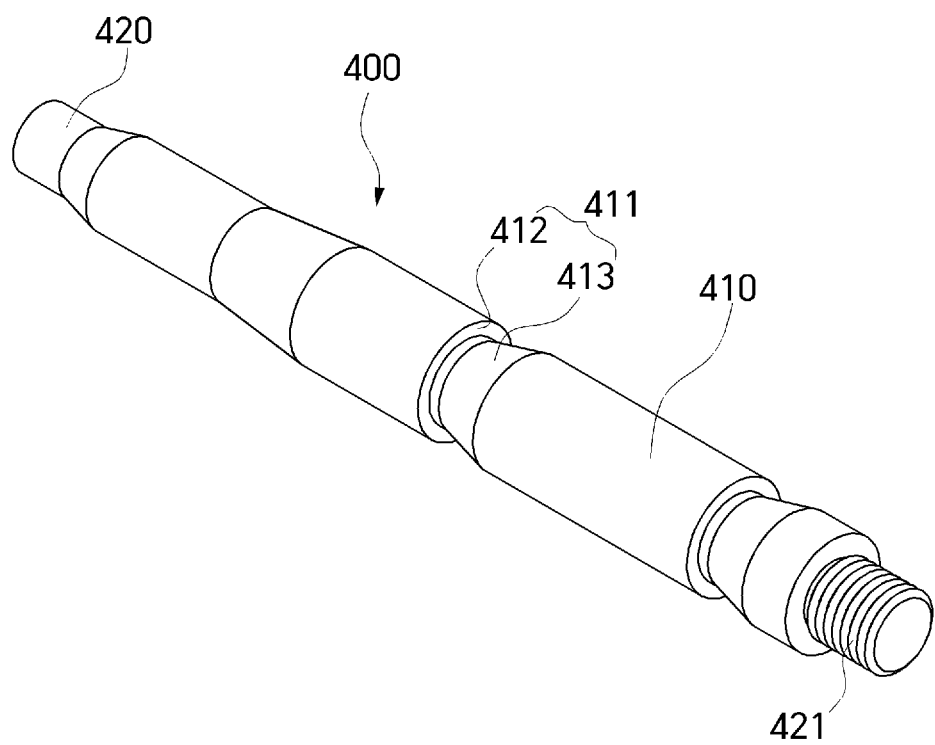
FIG. 16 is a perspective view showing a pin member of the cowl cross bar assembly according to the first embodiment.
Figure 17:
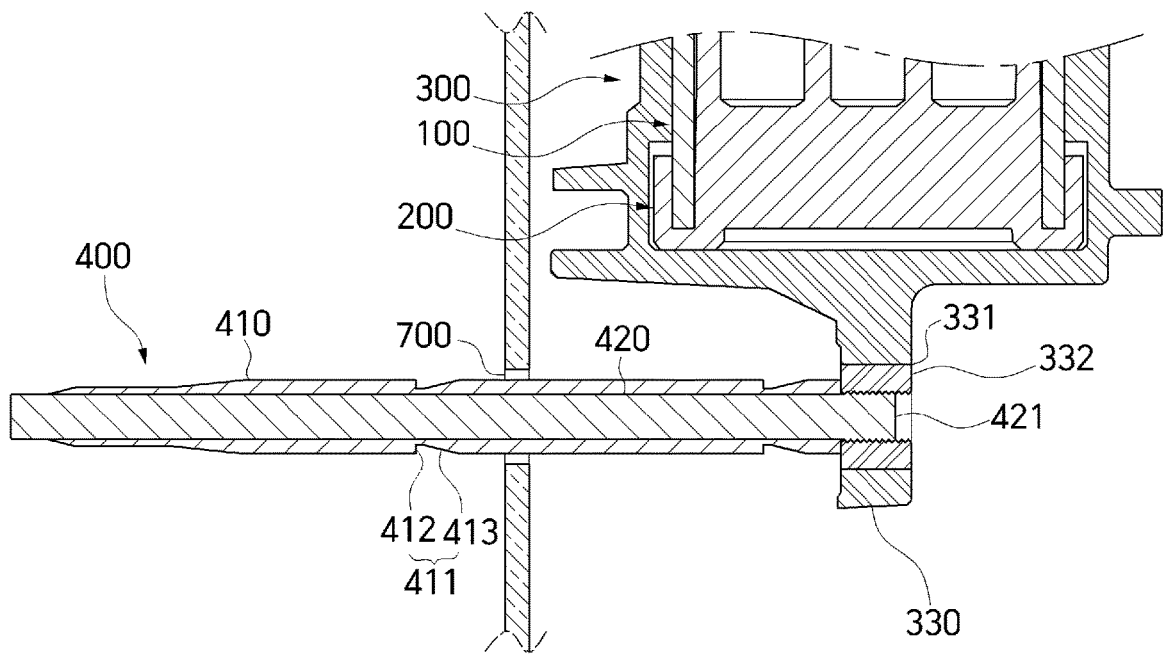
FIG. 17 is a cross-sectional view showing the pin member and a side bracket of the cowl cross bar assembly according to the first embodiment.
Figure 18:
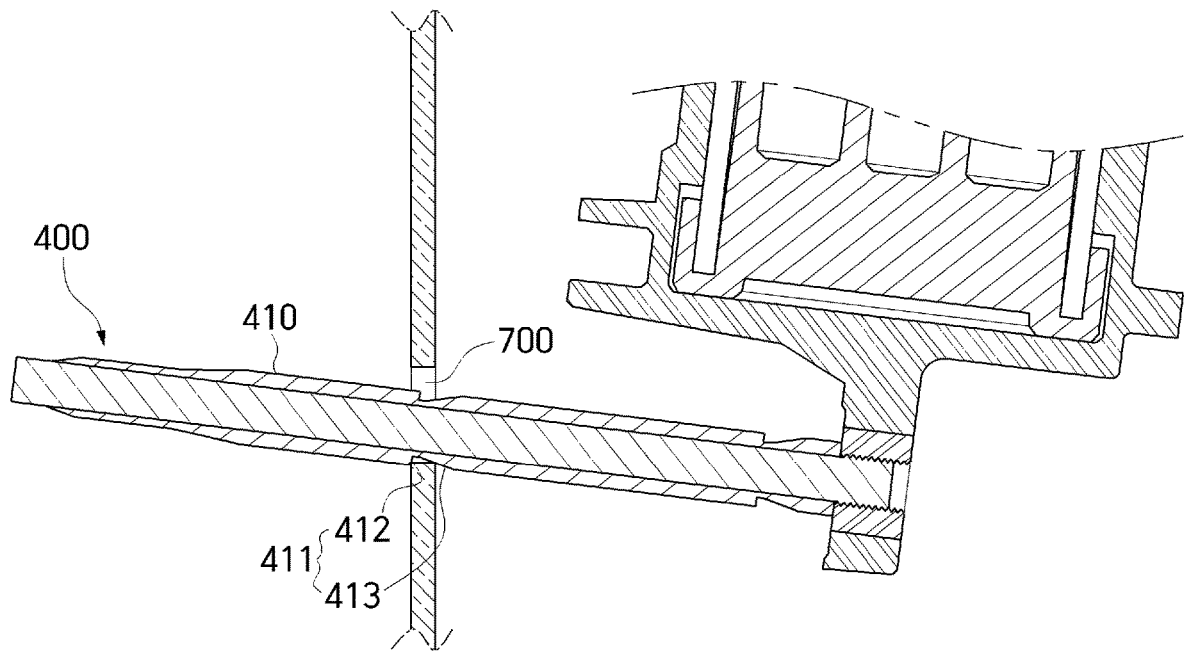
FIG. 18 is a cross-sectional view showing a state in which the pin member is held by a guide hole of a chassis according to the first embodiment.

FIG. 16 is a perspective view showing the pin member of the cowl cross bar assembly according to the first embodiment, FIG. 17 is a cross-sectional view showing the pin member and the side bracket of the cowl cross bar assembly according to the first embodiment, and FIG. 18 is a cross-sectional view showing a state in which the pin member is held by a guide hole of the chassis according to the first embodiment.

Referring to FIGS. 16 and 17, the pin member 400 according to the first embodiment may include polyamide and glass fiber.

The pin member 400 is coupled to the coupling groove 331 formed in the bent frame 330 of the side bracket 300.

When the cowl cross bar assembly, which is heavy due to a variety of completely assembled electrical components, is mounted on the chassis, the pin member 400 guides the cowl cross bar assembly to be mounted on a precise position on the chassis.

To this end, the pin member 400 is inserted into a guide hole.

The pin member 400 includes a first guide pin 410 and a second guide pin 420.

The first guide pin 410 is inserted into the guide hole of the chassis.

The first guide pin 410 has a hollow shaft shape.

Notches 411 are formed in a surface of the first guide pin 410 at positions spaced at a distance apart from each other along a longitudinal direction.

The notches 411 prevent or reduce the heavy cowl cross bar assembly from being separated from the chassis in a process of being mounted in the guide hole. The notches 411 each include a vertical surface 412 and a tilted surface 413 formed in a direction in which the first guide pin 410 is coupled to the chassis.

When sagging occurs due to a weight of the cowl cross bar assembly while the pin member 400 is inserted into the guide hole of the chassis, the vertical surface 412 of the notch 411 is held by the guide hole of the chassis as shown in FIG. 18.

Accordingly, the vertical surface 412 of the notch 411 may easily prevent or reduce the pipe 100 from being separated from the guide hole of the chassis.

The second guide pin 420 is inserted while passing through the first guide pin 410 formed of a hollow shaft. A length of the second guide pin 420 is formed to be longer than a length of the first guide pin 410.

Also, the pin member 400 is fixed to the side bracket 300 through a mutual screw-coupling method.

One end of the second guide pin 420 protrudes from the first guide pin 410.

The one end of the second guide pin 420 indicates a direction in which the side bracket 300 is disposed on the chassis.

A coupling portion 421 is formed on the one end of the second guide pin 420.

A screw thread is formed on a surface of the coupling portion 421, and a nut 332 including a thread groove is inserted into an inside of the coupling groove 331.

The coupling portion 421 and the nut 332 are coupled to each other through a screw-coupling method.

The nut 332 is coupled to the coupling groove 331 through an insert-injection molding method.

Accordingly, a structure of the pin member 400 according to the first embodiment of that is formed to be separate from the side bracket 300 and is coupled to the side bracket 300 through a screw-coupling method may increase stiffness in comparison to a conventional structure of a pin member and a side bracket that are integrally injection-molded.

Also, the pin member 400 according to one or more embodiments includes polyamide and glass fiber so as to significantly reduce a weight due to properties of material in comparison to a pin member including metallic material.

Also, stiffness of the second guide pin 420 coupled to the side bracket 300 is higher than stiffness of the first guide pin 410.

Accordingly, the second guide pin 420 may effectively prevent the pin member 400 from colliding with a peripheral part of the guide hole of the chassis and being easily damaged while being inserted into the guide hole.

Also, a pin member according to another embodiment may be coupled to the side bracket through a riveting method.

Hereinafter, a pin member and a side bracket of the cowl cross bar assembly according to another embodiment will be described below in detail.

Figure 19:
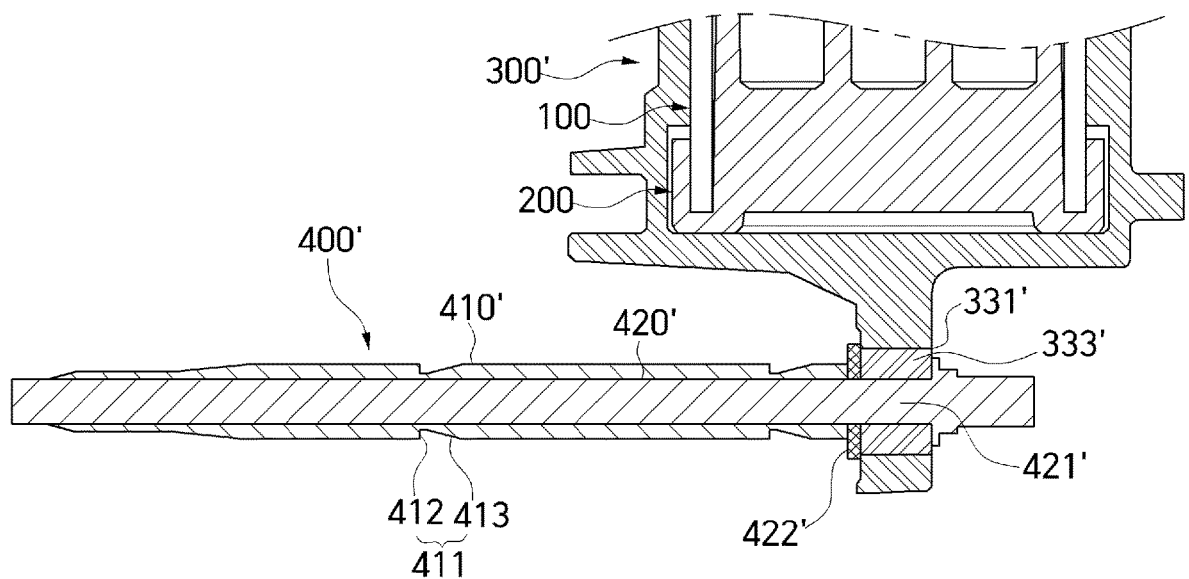
FIG. 19 is a cross-sectional view showing a pin member and a side bracket of the cowl cross bar assembly according to another embodiment.

FIG. 19 is a cross-sectional view showing a pin member and a side bracket of the cowl cross bar assembly according to another embodiment.

Components equal to those described in the above embodiment will be referred to as the same reference numerals, and a detailed description thereof will be omitted for sake of brevity.

Referring to FIG. 19, in a riveting type structure of a side bracket 300' and a pin member 400' according to another embodiment, a bushing 333' is coupled to a coupling groove 331' of the side bracket 300' through an insert-injection molding method.

One end of a second guide pin 420' protrudes from a first guide pin 410'.

A coupling portion 421' is formed on the one end of the second guide pin 420'.

The coupling portion 421' and the bushing 333' are coupled through a riveting method.

Accordingly, a structure of the pin member 400' according to another embodiment that is formed to be separate from the side bracket 300' and is coupled to the side bracket 300' through a riveting method may increase stiffness in comparison to a conventional structure of a pin member and a side bracket that are integrally injection-molded.

A rivet flange 422' is formed on one surface of the coupling portion 421'.

The rivet flange 422' prevents the pin member 400' from being excessively inserted toward the bushing 333' when the pin member 400' is coupled to the side bracket 300'.

Also, the pin member 400 according to one or more embodiments includes polyamide and glass fiber so as to significantly reduce a weight due to properties of material in comparison to a pin member including metallic material.

Figure 20:
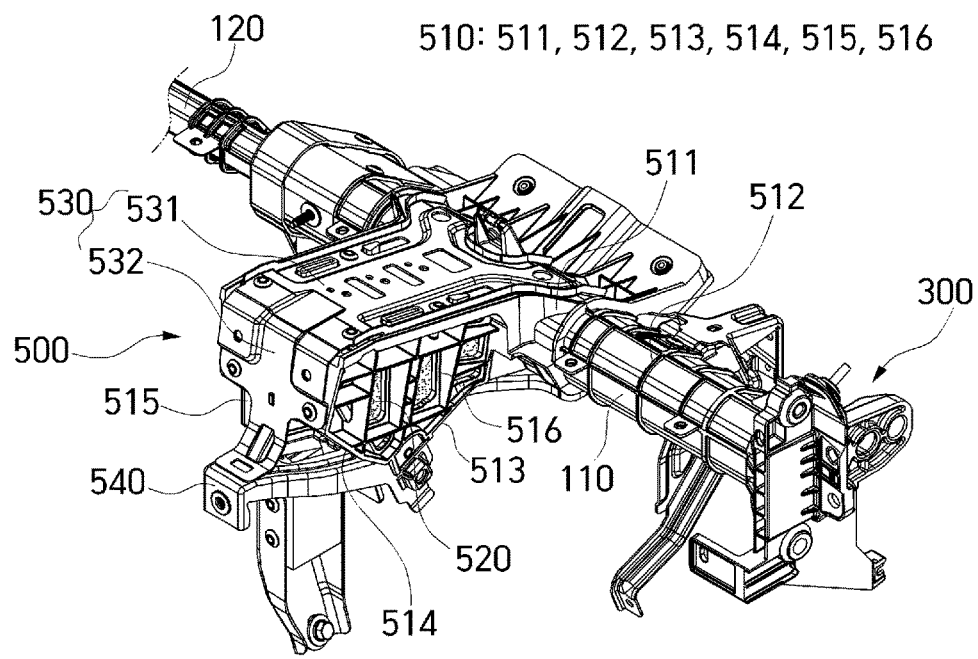
FIG. 20 is a perspective view showing a dash mounting member of the cowl cross bar assembly according to the first embodiment.
Figure 21:
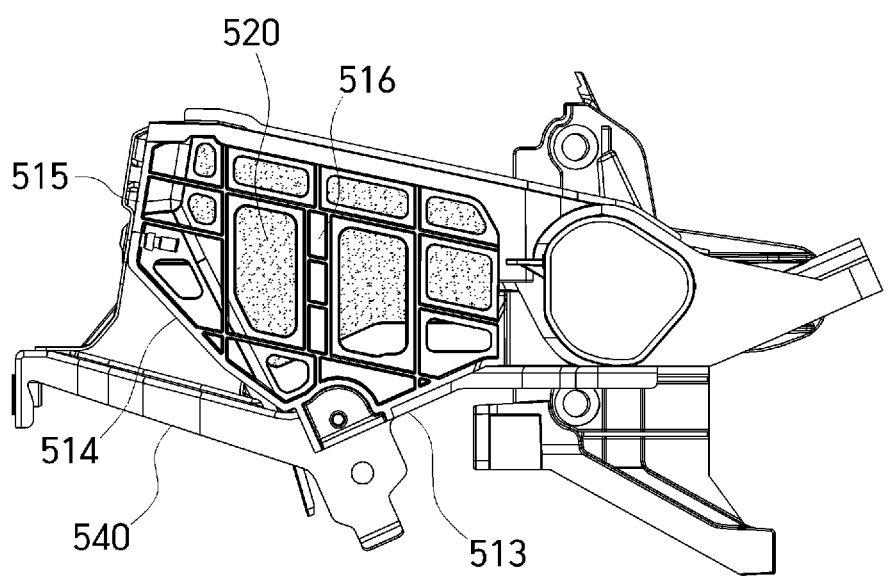
FIG. 21 is a side view showing the dash mounting member of the cowl cross bar assembly according to the first embodiment.
Figure 22:
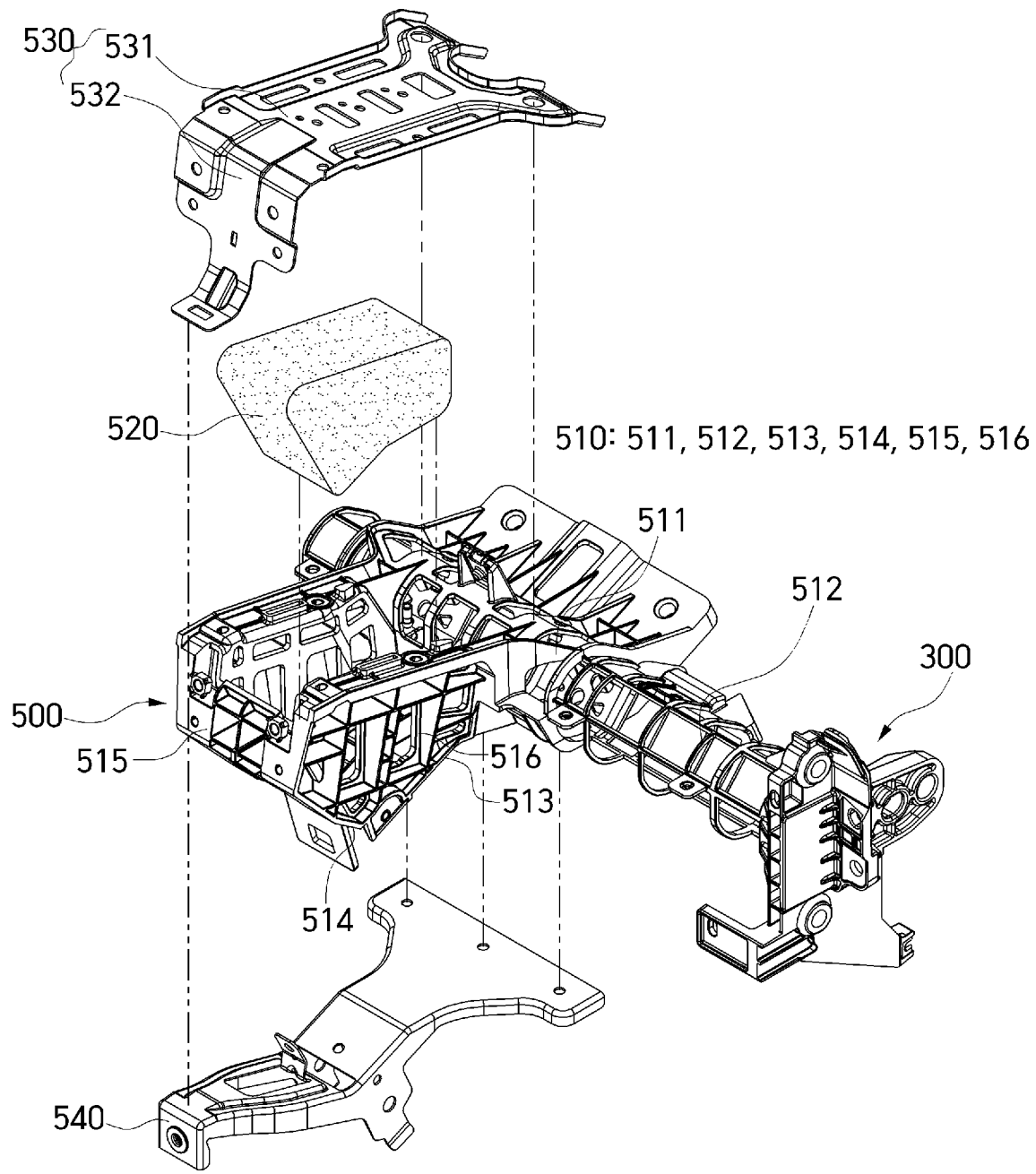
FIG. 22 is an exploded perspective view showing a dash mounting stiffener disassembled from a case of the cowl cross bar assembly according to the first embodiment.

FIG. 20 is a perspective view showing the dash mounting member of the cowl cross bar assembly according to the first embodiment, FIG. 21 is a side view showing the dash mounting member of the cowl cross bar assembly according to the first embodiment, and FIG. 22 is an exploded perspective view showing a dash mounting stiffener disassembled from a case of the cowl cross bar assembly according to the first embodiment.

Referring to FIGS. 20 to 22, a dash mounting member 500 according to the first embodiment is coupled to the pipe 100.

The dash mounting member 500 is coupled to the first pipe 110 corresponding to the driver's seat on the basis of a middle area in all the sections of the pipe 100.

Particularly, the dash mounting member 500 is coupled between both ends of the first pipe 110 to which the side bracket 300 and the center support 600 are coupled.

The dash mounting member 500 includes a case 510, a dash mounting stiffener 520, a stiffening plate 530, and a mounting bottom support portion 540.

The case 510 forms a body of the dash mounting member 500.

The case 510 has a polyhedral shape including an internal space.

The dash mounting stiffener 520 is accommodated in the polyhedral case 510.

The case 510 includes a dash mounting coupling portion 511, a side bracket connection portion 512, a first bottom surface portion 513, a second bottom surface portion 514, a front surface portion 515, and side surface portions 516.

The first pipe 110 is inserted into the dash mounting coupling portion 511.

A cross-sectional shape of an inner circumferential surface of the dash mounting coupling portion 511 is formed to be equal to the cross-sectional shape of the outer circumferential surface of the first pipe 110.

Accordingly, the inner circumferential surface of the dash mounting coupling portion 511 comes into contact with the outer circumferential surface of the first pipe 110.

That is, the first pipe 110 may be easily inserted into and coupled to the dash mounting coupling portion 511.

The side bracket connection portion 512 is disposed between the dash mounting coupling portion 511 and the side bracket 300.

The side bracket connection portion 512 surrounds the outer circumferential surface of the first pipe 110 and connects the dash mounting coupling portion 511 to the side bracket 300.

The side bracket connection portion 512, the dash mounting coupling portion 511, and the side bracket 300 may be integrally formed.

Accordingly, the side bracket 300 is fixed to the one end of the first pipe 110, and the dash mounting coupling portion 511 is integrally coupled to the side bracket 300 by the side bracket connection portion 512.

Accordingly, the side bracket connection portion 512 may restrict the dash mounting coupling portion 511 from freely moving along a longitudinal direction of the first pipe 110.

Further, the side bracket connection portion 512 and the dash mounting coupling portion 511 may include polypropylene and glass fiber like the side bracket 300.

Also, a plurality of grooves may be formed in outer circumferential surfaces of the dash mounting coupling portion 511 and the side bracket connection portion 512.

Accordingly, the dash mounting coupling portion 511 and the side bracket connection portion 512 may significantly reduce an overall weight of the cowl cross bar assembly.

Also, when a head-on collision of the vehicle occurs, broken pieces generated when the dash mounting coupling portion 511 and the side bracket connection portion 512 are damaged may be reduced so as to reduce and amount of injury to a passenger caused by the broken pieces.

The first bottom surface portion 513 is formed of a panel and extends from the dash mounting coupling portion 511 toward a front of the vehicle.

In detail, the first bottom surface portion 513 extends downward from a front of the dash mounting coupling portion 511 at a certain angle as shown in FIG. 21.

The second bottom surface portion 514 is a panel having the same width as that of the first bottom surface portion 513 and extends from one end of the second bottom surface portion 514 toward the front of the vehicle.

In detail, the second bottom surface portion 514 extends upward from an end of the first bottom surface portion 513 at a certain angle as shown in FIG. 21.

That is, the first bottom surface portion 513 and the second bottom surface portion 514 are formed to have an inverted-triangular shape when viewed from the side.

The first bottom surface portion 513 and the second bottom surface portion 514 close a bottom surface of the case 510.

The front surface portion 515 vertically extends upward from an end of the second bottom surface portion 514 and closes a front of the case 510.

The side surface portions 516 vertically extend upward from both side ends of the first bottom surface portion 513 and the second bottom surface portion 514 and close both side surfaces of the case 510.

Accordingly, the case 510 has an internal space formed by the first bottom surface portion 513, the second bottom surface portion 514, the front surface portion 515, and the side surface portions 516 and has a shape with an open top.

The dash mounting stiffener 520 is accommodated in the case 510 that has the space formed therein and the open top as shown in FIG. 22.

The dash mounting stiffener 520 is formed of energy-absorbing foam.

The dash mounting stiffener 520 may have the same polyhedral shape as that of the inner side of the case to be accommodated in the case 510.

The dash mounting stiffener 520 includes an injection-molded compound formed of energy-absorbing foam, for example, polypropylene or polyurethane or a combination thereof.

Accordingly, when a collision accident of the vehicle occurs, the dash mounting stiffener 520 absorbs collision energy that acts on the dash mounting member 500 due to properties of material so as to minimize the collision energy transferred to the dash mounting member 500 and to protect a passenger.

Accordingly, the dash mounting stiffener 520 and the case 510 including an injection-molded compound may secure stiffness against the collision accident of the vehicle or the like.

The stiffening plate 530 includes metallic material such as steel.

The stiffening plate 530 is coupled to some surfaces of the case 510.

The stiffening plate 530 includes a top surface stiffening plate 531 and a front surface stiffening plate 532.

The top surface stiffening plate 531 seals the open top of the case 510.

The front surface stiffening plate 532 is disposed on the front of the case 510.

Accordingly, the stiffening plate 530 surrounds parts of a top surface and a front surface of the case 510 through the top surface stiffening plate 531 and the front surface stiffening plate 532.

Also, as described above, the top surface stiffening plate 531 seals the open top surface of the case 510

Accordingly, the top surface stiffening plate 531 blocks the dash mounting stiffener 520 from being separated externally through the top of the case 510.

Also, the stiffening plate 530 formed of metallic material and the dash mounting member 500 formed of an injection-molded compound reduce collision energy applied to the dash mounting member 500 together so as to prevent or reduce the dash mounting member 500 from being plastic-deformed and damaged.

The stiffening plate 530 is coupled to the case 510 using a bolt member.

Although not shown in the drawing, the stiffening plate 530 according to another embodiment may be hinge-coupled to the case 510 in a direction opposite to a direction in which the front surface stiffening plate 532 is disposed on the top surface stiffening plate 531.

Accordingly, in the stiffening plate 530 according to another embodiment, when the dash mounting stiffener 520 accommodated in the case 510 is replaced, the top of the case 510 may be easily opened by rotating the top surface stiffening plate 531 around a high coupling portion.

The mounting bottom support portion 540 is formed of metallic material such as steel.

The mounting bottom support portion 540 is formed of a panel and extends from the dash mounting coupling portion 511 toward the front of the vehicle.

The mounting bottom support portion 540 is disposed below the case 510 and supports the case 510.

The mounting bottom support portion 540 comes into contact with the first bottom surface portion 513 and extends along the first bottom surface portion 513.

One end of the mounting bottom support portion 540 is fixed to the case 510 by a bolt member passing through the dash mounting coupling portion 511.

Also, a bottom end of the front surface stiffening plate 532 comes into contact with the other end of the mounting bottom support portion 540 so that the front surface stiffening plate 532 is supported.

The mounting bottom support portion 540 formed of metallic material, the dash mounting member 500 formed of an injection-molded compound, and the stiffening plate 530 formed of metallic material reduce the collision energy applied to the dash mounting member 500 together.

Accordingly, the dash mounting member 500 prevents or reduces the dash mounting member 500 from being plastic-deformed and damaged.

Also, a dash mounting member according to another embodiment may have a band shape.

Hereinafter, the dash mounting member of the cowl cross bar assembly according to another embodiment will be described below in detail.

Figure 23:
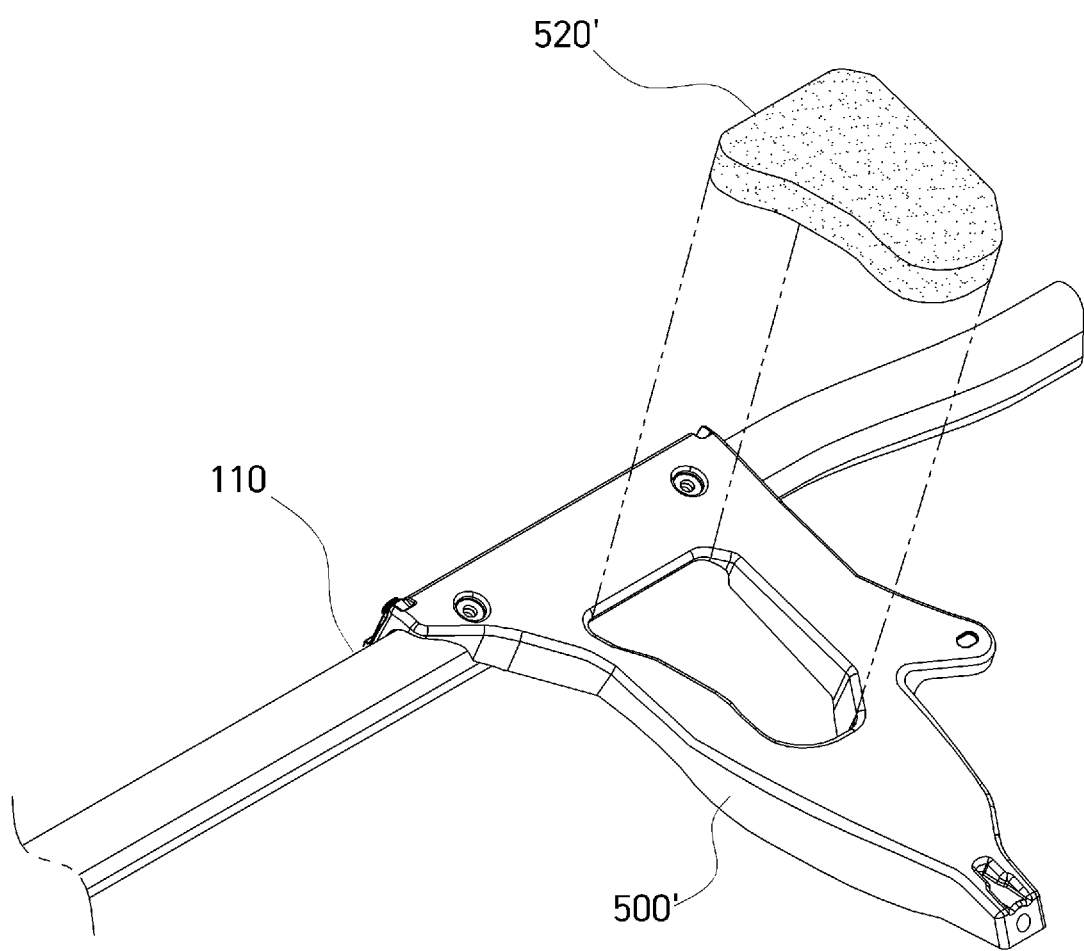
FIG. 23 is a perspective view showing a dash mounting member of the cowl cross bar assembly according to another embodiment.

FIG. 23 is a perspective view showing the dash mounting member of the cowl cross bar assembly according to another embodiment.

Components equal to those described in the above embodiment will be referred to as the same reference numerals, and a detailed description thereof will be omitted for sake of brevity.

Referring to FIG. 23, a dash mounting member 500' according to another embodiment is coupled to the pipe 100.

The dash mounting member 500' is coupled to the first pipe 110 corresponding to the driver's seat on the basis of the middle area in all the sections of the pipe 100.

Particularly, the dash mounting member 500' is coupled between both ends of the first pipe 110 to which the side bracket 300 and the center support 600 are coupled.

The dash mounting member 500' has a band shape in a plan view.

A dash mounting stiffener 520' is disposed in a space of the dash mounting member 500' that has band shape.

The band-shaped space of the dash mounting member 500' has an area smaller than an area of the dash mounting stiffener 520'.

Accordingly, the dash mounting member 500' having the band shape may firmly fix the dash mounting stiffener 520'.

Thus, since the dash mounting member 500' according to another embodiment has the band shape, an overall weight of the cowl cross bar assembly may be further decreased.

Although it has been described that the dash mounting member 500 or 500' according to one or more embodiments has the polyhedral shape or band shape, in addition to the above shape, the dash mounting stiffener 520 or 520' may have a variety of shapes as long as it is possible to effectively reduce collision energy applied to the vehicle by disposing the dash mounting stiffener 520 or 520'.

Figure 24:
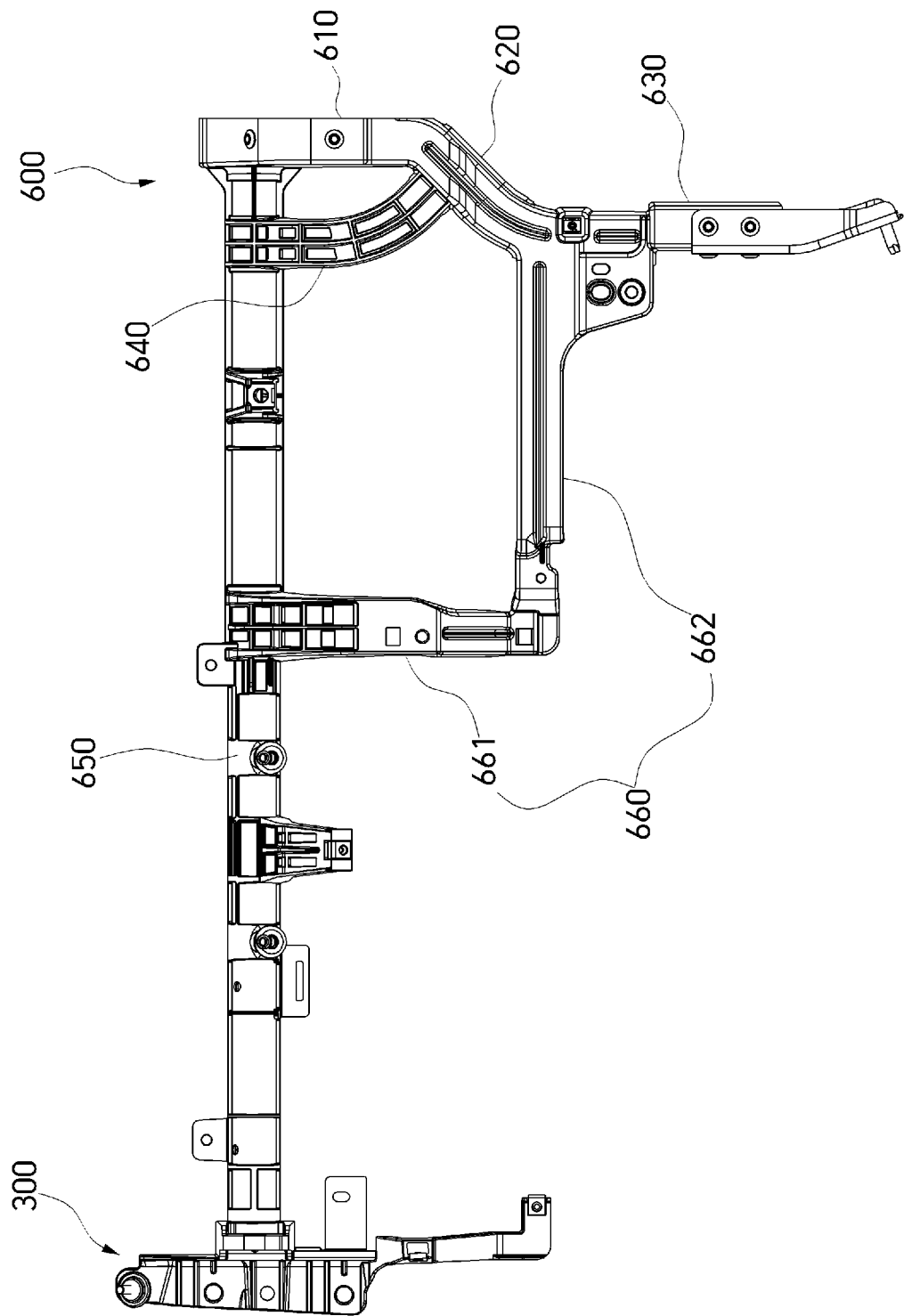
FIG. 24 is a front view showing a center support into which a second pipe included in the cowl cross bar assembly shown in FIG. 1 is inserted.

FIG. 24 is a front view showing the center support into which the second pipe included in the cowl cross bar assembly shown in FIG. 1 is inserted.

Referring to FIG. 24, the center support 600 according to the first embodiment improves noise, vibration, and harshness (NVH) performance of a vehicle by suppressing vibration of a steering wheel caused by resonance while the vehicle stops or drives.

One end of the center support 600 is disposed between the first pipe 110 and the second pipe 120.

Also, the other end of the center support 600 is fixed to the dash panel of the chassis and supports vertical vibrations of the pipe 100.

The center support 600 includes a first vertical portion 610, an intermediate portion 620, a second vertical portion 630, a stiffening portion 640, a side bracket connection portion 650, and a support frame 660.

The first vertical portion 610 extends in a first direction perpendicular to a longitudinal direction of the second pipe 120.

Here, the first direction is a downward direction.

The intermediate portion 620 is disposed between the first vertical portion 610 and the second vertical portion 630 and connects ends of the first vertical portion 610 and the second vertical portion 630 to each other.

The intermediate portion 620 extends in a second direction that meets the first direction at a certain angle.

The second vertical portion 630 extends from an end of the intermediate portion 620 in the first direction.

Accordingly, in the center support 600, the intermediate portion 620 thereof has a bent shape and the first vertical portion 610 and the second vertical portion 630 are spaced apart from each other in a longitudinal direction of the second pipe 120.

The first vertical portion 610 is disposed between the first pipe 110 and the second pipe 120 and divides an area of the driver's seat from an area of the front passenger's seat.

In a front view, the intermediate portion 620 has a shape bent toward the front passenger's seat according to a layout of the vehicle in which a console area is reduced to secure an internal space of the vehicle.

An end of the second vertical portion 630 is fixedly coupled to the dash panel using a bolt member.

The stiffening portion 640 extends in the first direction perpendicular to the longitudinal direction of the second pipe 120 to meet the second pipe 120 at the right angle when viewed from the front of the vehicle and to be parallel to the second vertical portion 630.

Here, the first direction is a downward direction.

The stiffening portion 640 is formed at a position spaced at a distance apart from the first vertical portion 610 in the longitudinal direction of the second pipe 120.

One end of the stiffening portion 640 is fixed to the second pipe 120, and the other end is bent toward the first vertical portion 610 while forming a curve to be fixed to a middle area of the intermediate portion 620.

Accordingly, the stiffening portion 640 may firmly prevent or reduce sagging of the second pipe 120.

The side bracket connection portion 650 may be disposed between the stiffening portion 640 and the side bracket 300 and be integrally formed with the stiffening portion 640 and the side bracket 300.

The side bracket connection portion 650 surrounds the outer circumferential surface of the second pipe 120 and connects the stiffening portion 640 to the side bracket 300.

Also, the side bracket connection portion 650 and the stiffening portion 640 may include polypropylene and glass fiber like the side bracket 300.

Further, a plurality of grooves may be formed in an outer circumferential surface of the side bracket connection portion 650.

Accordingly, the side bracket connection portion 650 may significantly reduce an overall weight of the cowl cross bar assembly.

Also, the side bracket connection portion 650 including the plurality of grooves may reduce broken pieces of the side bracket connection portion 650 damaged when a head-on collision of the vehicle occurs so as to reduce an amount of injury to a passenger caused by the broken pieces.

The support frame 660 is configured to support a car audio and the like and is formed from the side bracket connection portion 650 to an area in which the car audio and the like of the vehicle are disposed.

The support frame 660 is fixed to an end of the intermediate portion 620 and the side bracket connection portion 650.

The support frame 660 includes a first frame 661 and a second frame 662.

The first frame 661 extends vertically from a middle area of the side bracket connection portion 650.

The second frame 662 extends horizontally from an end of the first frame 661 in a direction, in which the intermediate portion 620 is disposed, and connects the end of the first frame 661, the intermediate portion 620, and the second vertical portion 630 to one another.

The first frame 661 and the second frame 662 may be integrally formed with the intermediate portion 620 and the side bracket 300.

An overall shape of the support frame 660 is, for example, a quadrangular shape when viewed from the front of the vehicle.

Also, the car audio and the like of the vehicle is disposed in a space having the quadrangular shape and is assembled to the support frame 660.

The support frame 660 may have a variety of shapes according to a layout of an interior of the vehicle.

Also, a dash mounting member and a center support according to a second embodiment may be connected to each other.

Hereinafter, the dash mounting member and the center support of a cowl cross bar assembly according to the second embodiment will be described below in detail with reference to the accompanying drawings.

Figure 25:
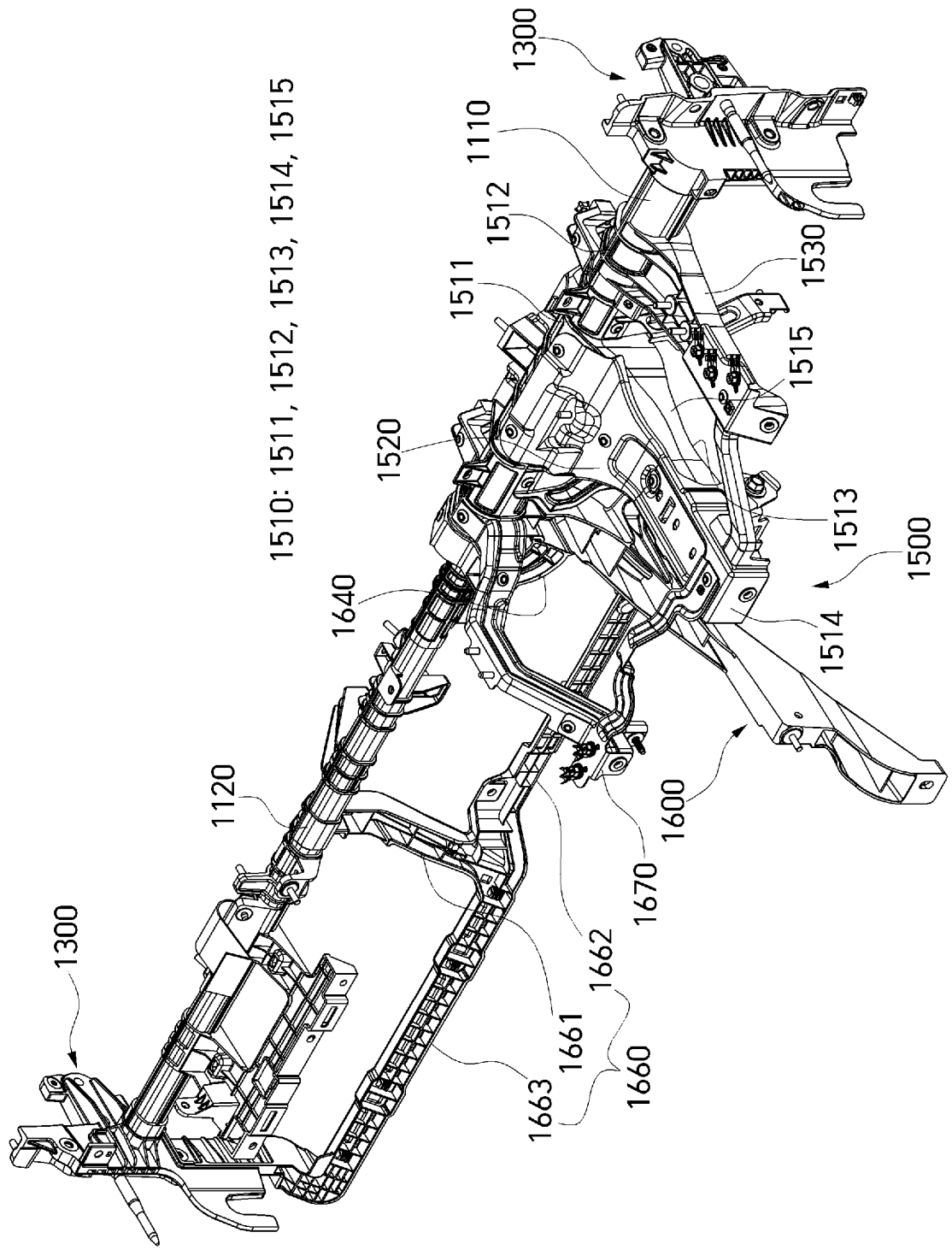
FIG. 25 is a perspective view showing a cowl cross bar assembly according to a second embodiment.

FIG. 25 is a perspective view showing the cowl cross bar assembly according to the second embodiment.

Referring to FIG. 25, the cowl cross bar assembly according to the second embodiment includes a pipe 1100 fixed to an interior of the vehicle in a lateral direction, pipe caps fitting on both ends of the pipe 1100, side brackets 1300 coupled to the pipe caps through insert-injection molding, pin members coupled to the side brackets 1300, a dash mounting member 1500 fixed to the pipe 1100, a mounting connection bracket 1530, a center support 1600, and a support connection bracket 1670.

Hereinafter, only the dash mounting member 1500 and the center support 1600, which have differences from those of the cowl cross bar assembly according to the first embodiment of the present invention, will be described for sake of brevity.

The dash mounting member 1500 according to the second embodiment is coupled to a first pipe 1110 corresponding to the driver's seat based on a middle area in all sections of the pipe 1100.

The dash mounting member 1500 includes a case 1510 and a stiffening plate 1520.

The case 1510 forms a body of the dash mounting member 1500 and includes a dash mounting coupling portion 1511, a side bracket connection portion 1512, a bottom surface portion 1513, a front surface portion 1514, and a side surface portion 1515.

The first pipe 1110 is inserted into the dash mounting coupling portion 1511.

A cross-sectional shape of an inner circumferential surface of the dash mounting coupling portion 1511 is formed to be equal to a cross-sectional shape of an outer circumferential surface of the first pipe 1110 so that the inner circumferential surface of the dash mounting coupling portion 1511 comes into contact with the outer circumferential surface of the first pipe 1110.

That is, the first pipe 1110 may be easily inserted into and coupled to the dash mounting coupling portion 1511.

The side bracket connection portion 1512 is disposed between the dash mounting coupling portion 1511 and the side bracket 1300.

The side bracket connection portion 1512 surrounds the outer circumferential surface of the first pipe 1110 and connects the dash mounting coupling portion 1511 to the side bracket 1300.

The side bracket connection portion 1512, the dash mounting coupling portion 1511, and the side bracket 1300 may be integrally formed.

Accordingly, the side bracket 1300 is fixed to one end of the first pipe 1110, and the dash mounting coupling portion 1511 is integrally coupled to the side bracket 1300 by the side bracket connection portion 1512.

Thus, the side bracket connection portion 1512 may restrict the dash mounting coupling portion 1511 from freely moving along a longitudinal direction of the first pipe 1110.

The bottom surface portion 1513 is formed of a panel and extends from the dash mounting coupling portion 1511 toward the front of the vehicle to close a bottom surface of the case 1510.

The front surface portion 1514 vertically extends upward from an end of the bottom surface portion 1513 and closes a front of the case 1510.

The side surface portions 1515 vertically extend upward from both ends of the bottom surface portion 1513 and close both sides of the case 1510.

Accordingly, the case 1510 has an internal space formed by the bottom surface portion 1513, the front surface portion 1514, and the side surface portions 1515 and has a shape with an open top.

The stiffening plate 1520 is formed of metallic material such as steel and seals the open top of the case 1510.

Also, the stiffening plate 1520 formed of metallic material and the case 1510 formed of an injection-molded compound reduce collision energy applied to the dash mounting member 1500 together so as to prevent or reduce the dash mounting member 1500 from being plastic-deformed and damaged.

The stiffening plate 1520 is coupled to the case 1510 using a bolt member.

Figure 26:
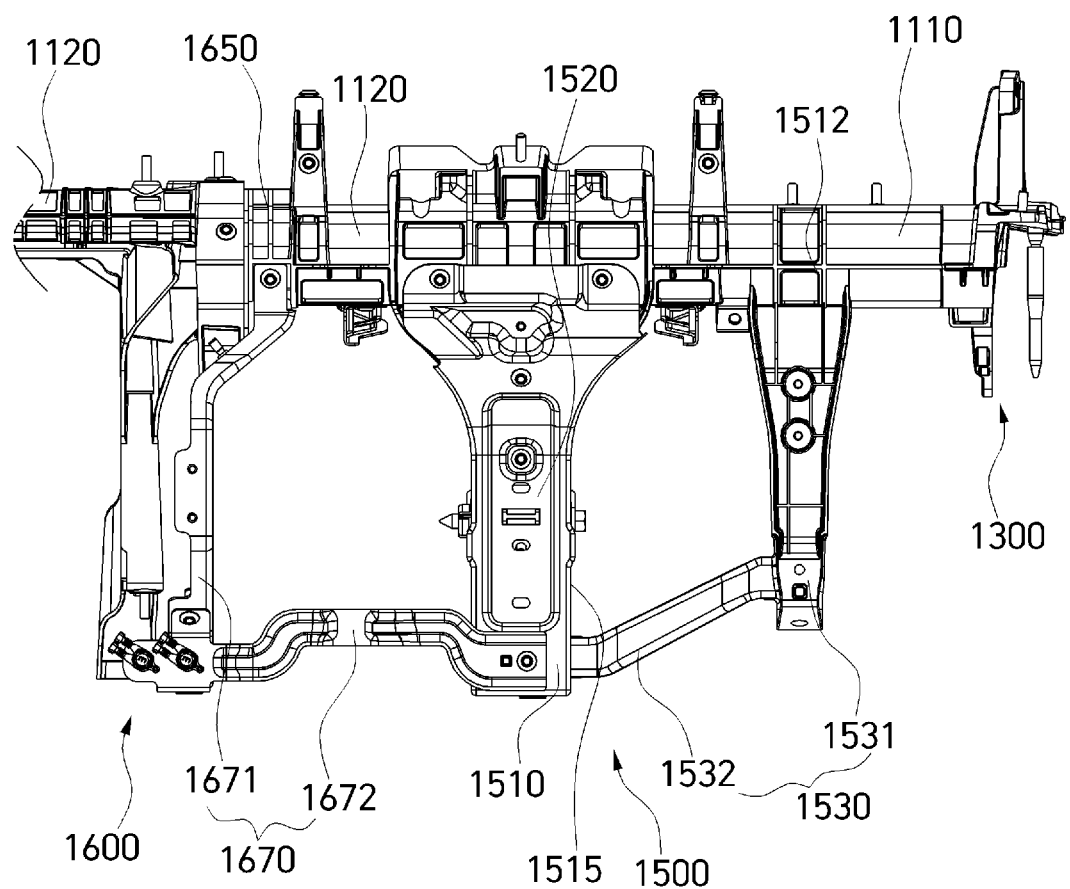
FIG. 26 is a partial plan view showing the cowl cross bar assembly shown in FIG. 25.

FIG. 26 is a partial plan view showing the cowl cross bar assembly shown in FIG. 25.

Referring to FIG. 26, the mounting connection bracket 1530 is formed of aluminum and is fixed to the dash mounting member 1500 and the first pipe 1110 of the pipe 1100.

The mounting connection bracket 1530 is configured to supplement stiffness of the dash mounting member 1500 and includes a first mounting bracket 1531 and a second mounting bracket 1532.

The first mounting bracket 1531 is spaced at a distance apart from the first pipe 1110 by as much as a distance from the dash mounting member 1500 and extends in a direction parallel to the case 1510.

The first mounting bracket 1531 is parallel to the case 1510.

The second mounting bracket 1532 is spaced at a distance apart from the first pipe 1110 and connects the first mounting bracket 1531 to the case 1510.

The second mounting bracket 1532 is parallel to the first pipe 1110.

One end of the second mounting bracket 1532 is fixed to the first mounting bracket 1531, and the other end thereof is fixed to the side surface portion 1515 of the case 1510.

Accordingly, the mounting connection bracket 1530 may be connected to the first pipe 1110 and the case 1510 so as to effectively supplement stiffness of the dash mounting member 1500.

Figure 27:
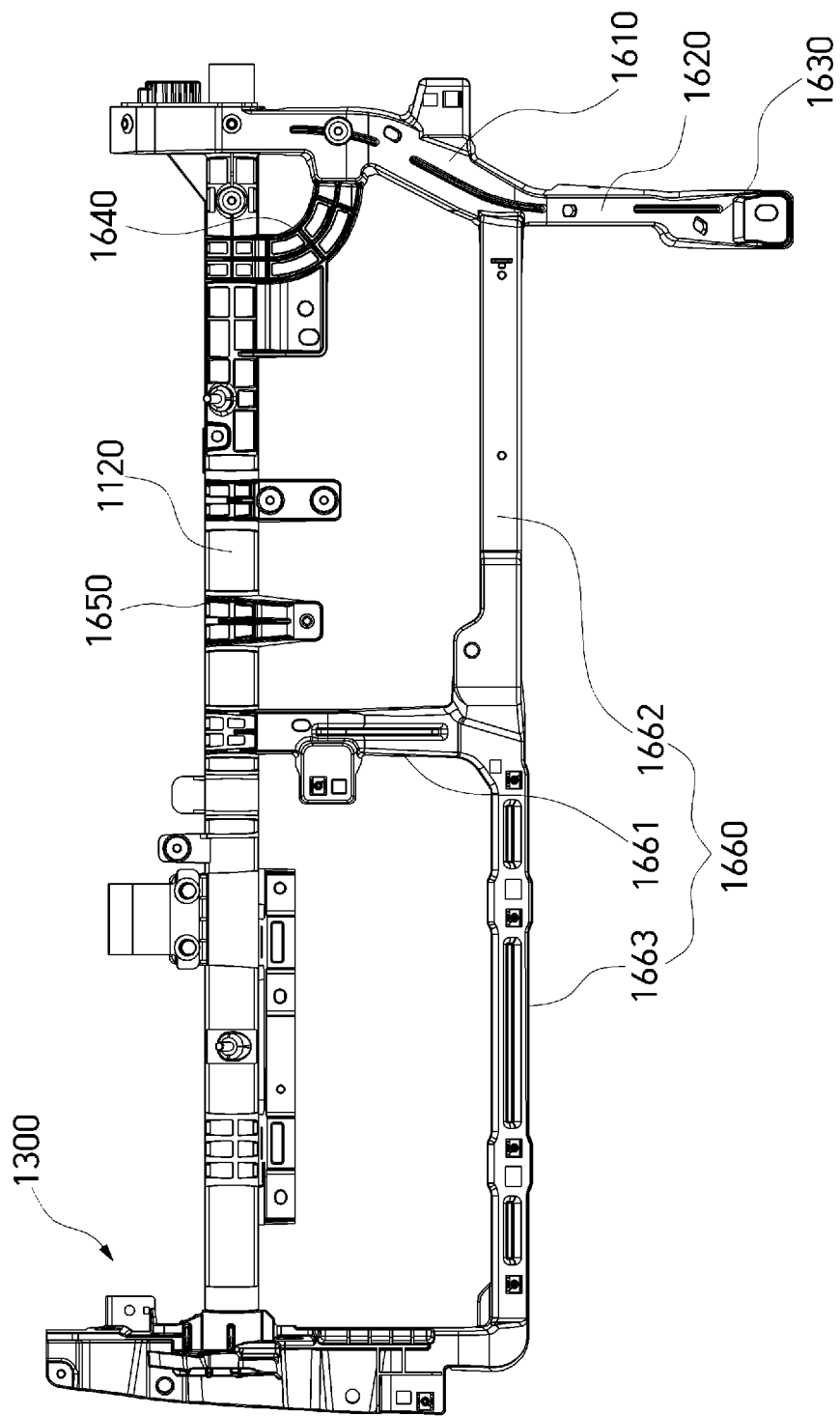
FIG. 27 is a front view showing a center support into which a second pipe included in the cowl cross bar assembly shown in FIG. 25 is inserted.

FIG. 27 is a front view showing the center support into which the second pipe included in the cowl cross bar assembly shown in FIG. 25 is inserted.

Referring to FIG. 27, the center support 1600 is configured to improve NVH performance of the vehicle, and one end thereof is disposed between the first pipe 1110 and the second pipe 1120 and the other end is fixed to the dash panel of the chassis to support vertical vibrations of the pipe 1100.

The center support 1600 includes a first vertical portion 1610, an intermediate portion 1620, a second vertical portion 1630, a stiffening portion 1640, a side bracket connection portion 1650, and a support frame 1660.

The first vertical portion 1610 extends in a first direction perpendicular to a longitudinal direction of the second pipe 1120.

Here, the first direction is a downward direction.

The first vertical portion 1610 is disposed between the first pipe 1110 and the second pipe 1120 and divides an area of the driver's seat from an area of the front passenger's seat.

The intermediate portion 1620 is disposed between the first vertical portion 1610 and the second vertical portion 1630 and connects ends of the first vertical portion 1610 and the second vertical portion 1630 to each other.

The intermediate portion 1620 extends in a second direction that meets the first direction at a certain angle.

In a front view, the intermediate portion 1620 has a shape bent toward the front passenger's seat according to a layout of the vehicle in which a console area is reduced to secure an internal space of the vehicle.

The second vertical portion 1630 extends from an end of the intermediate portion 1620 in the first direction.

Accordingly, in the center support 1600, the intermediate portion 1620 thereof has a bent shape and the first vertical portion 1610 and the second vertical portion 1630 are spaced apart from each other in a longitudinal direction of the second pipe 1120.

An end of the second vertical portion 1630 is fixedly coupled to the dash panel using a bolt member.

The stiffening portion 1640 extends in a first direction perpendicular to the longitudinal direction of the second pipe 1120.

Here, the first direction is a downward direction.

The stiffening portion 1640 meets the second pipe 1120 at the right angle and is parallel to the second vertical portion 1630 when viewed from the front of the vehicle.

The stiffening portion 1640 is formed at a position spaced at a distance apart from the first vertical portion 1610 in the longitudinal direction of the second pipe 1120.

One end of the stiffening portion 1640 is fixed to the second pipe 1120, and the other end is bent toward the first vertical portion 1610 while forming a curve to be fixed to an end of the first vertical portion 1610.

Accordingly, the stiffening portion 1640 may firmly prevent or reduce sagging of the second pipe 1120.

The side bracket connection portion 1650 is disposed between the first vertical portion 1610 and the side bracket 1300 and connects the first vertical portion 1610 to the side bracket 1300.

The side bracket connection portion 1650, the first vertical portion 1610, and the side bracket 1300 may be integrally formed.

The side bracket connection portion 1650 surrounds an outer circumferential surface of the second pipe 1120.

Also, the side bracket connection portion 1650 and the first vertical portion 1610 may include polypropylene and glass fiber like the side bracket 1300.

The support frame 1660 is configured to support a car audio and a glove box and is formed from the side bracket connection portion 1650 to an area in which the car audio and the glove box of the vehicle are disposed.

The support frame 1660 is fixed to an end of the intermediate portion 1620, the side bracket connection portion 1650, and the side bracket 1300.

The support frame 1660 includes a first frame 1661, a second frame 1662, and a third frame 1663.

The first frame 1661 extends from a middle area of the side bracket connection portion 1650 in the first direction perpendicular thereto.

Here, the first direction is a downward direction.

The second frame 1662 horizontally extends from an end of the first frame 1661 in a direction, in which the intermediate portion 1620 is disposed, and connects the end of the first frame 1661 to a middle area of the intermediate portion 1620.

The first frame 1661 and the second frame 1662 may be integrally formed with the intermediate portion 1620 and the side bracket connection portion 1650.

The car audio and the like are assembled to the first frame 1661 and the second frame 1662.

The third frame 1663 horizontally extends from the end of the first frame 1661 in a direction, in which the side bracket 1300 is disposed, and connects the end of the first frame 1661 to an end of the side bracket 1300.

The third frame 1663 and the first frame 1661 are integrally formed with the side bracket connection portion 1650 and the side bracket 1300.

The glove box is assembled to the first frame 1661 and the third frame 1663.

Referring back to FIG. 26, the support connection bracket 1670 includes aluminum like the mounting connection bracket 1530.

The support connection bracket 1670 is fixed to the dash mounting member 1500 and the center support 1600.

The support connection bracket 1670 is configured to supplement vertical stiffness of the center support 1600, which is formed to be tilted, and includes a first support bracket 1671 and a second support bracket 1672.

The first support bracket 1671 is spaced at a distance apart from the second pipe 1120 by as much as a distance from the dash mounting member 1500 and extends in a direction in which the case 1510 extends.

The first support bracket 1671 is parallel to the case 1510.

The second support bracket 1672 is spaced at a distance apart from the second pipe 1120 and connects the first support bracket 1671 to the case 1510.

The second support bracket 1651 is parallel to the second pipe 1120.

One end of the second support bracket 1651 is fixed to the first support bracket 1671, and the other end thereof is fixed to a bottom surface portion 1513 of the case 1510.

Accordingly, the first support bracket 1671 and the second support bracket 1672 have a rectangular shape in a plan view.

Accordingly, the support connection bracket 1670 may supplement vertical stiffness of the center support 1600, which is formed to be tilted, and may further improve noise, vibration, and harshness (NVH) performance.

Further, a center support according to a third embodiment may increase vertical stiffness.

Hereinafter, a center support of a cowl cross bar assembly according to the third embodiment will be described below in detail.

Figure 28:
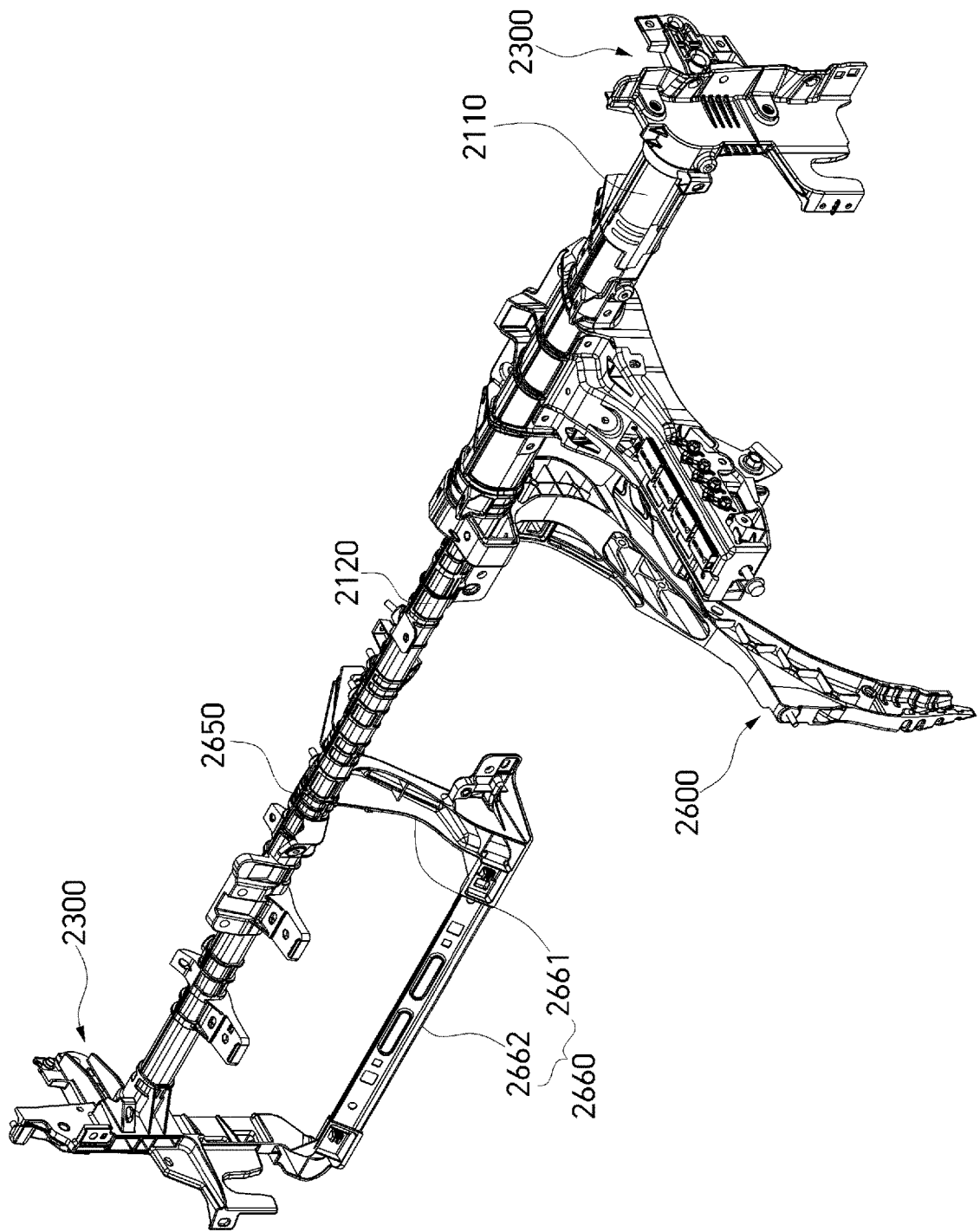
FIG. 28 is a perspective view showing a cowl cross bar assembly according to a third embodiment.
Figure 29:
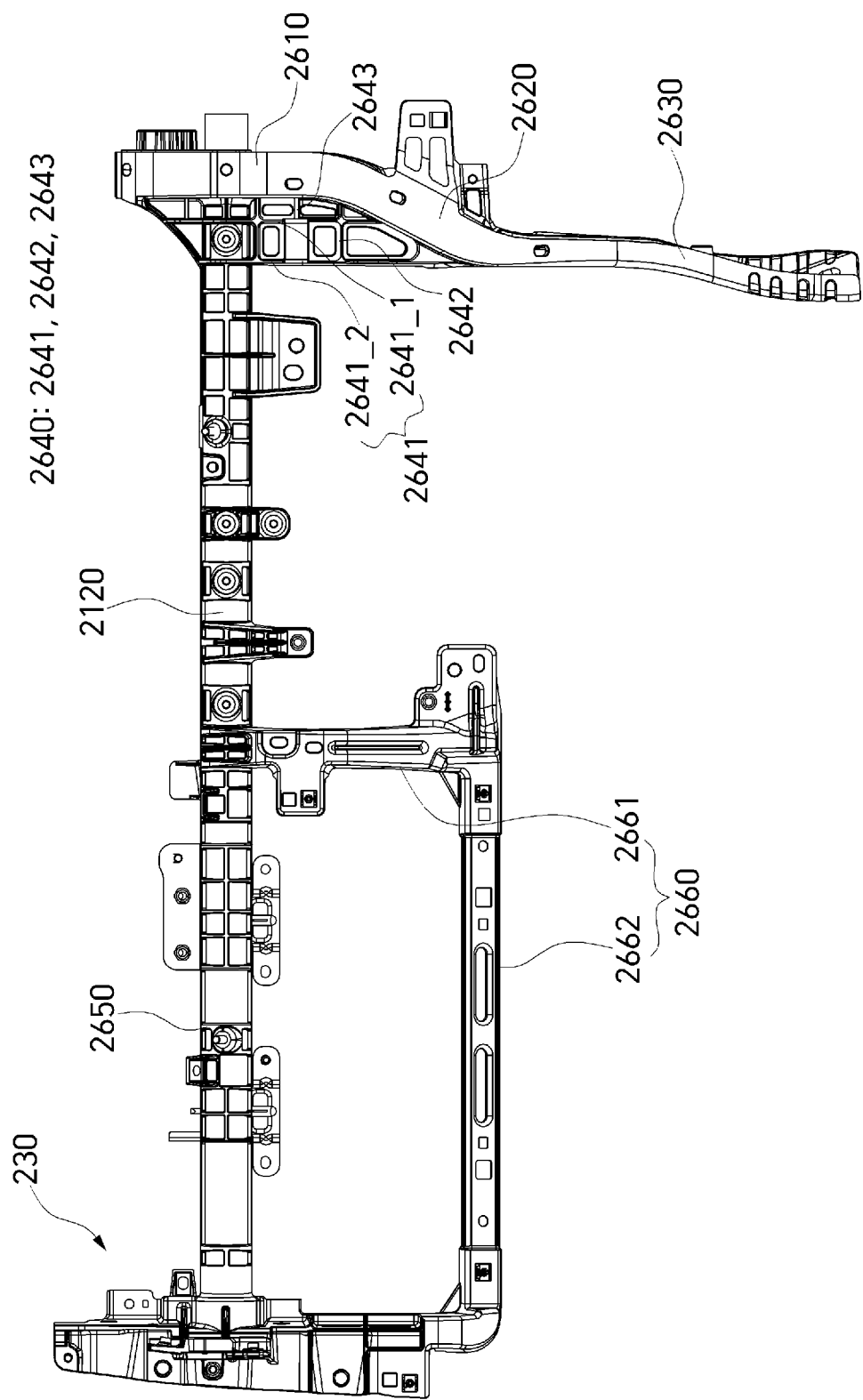
FIG. 29 is a front view showing a center support into which a second pipe included in the cowl cross bar assembly shown in FIG. 28 is inserted.
Figure 30:
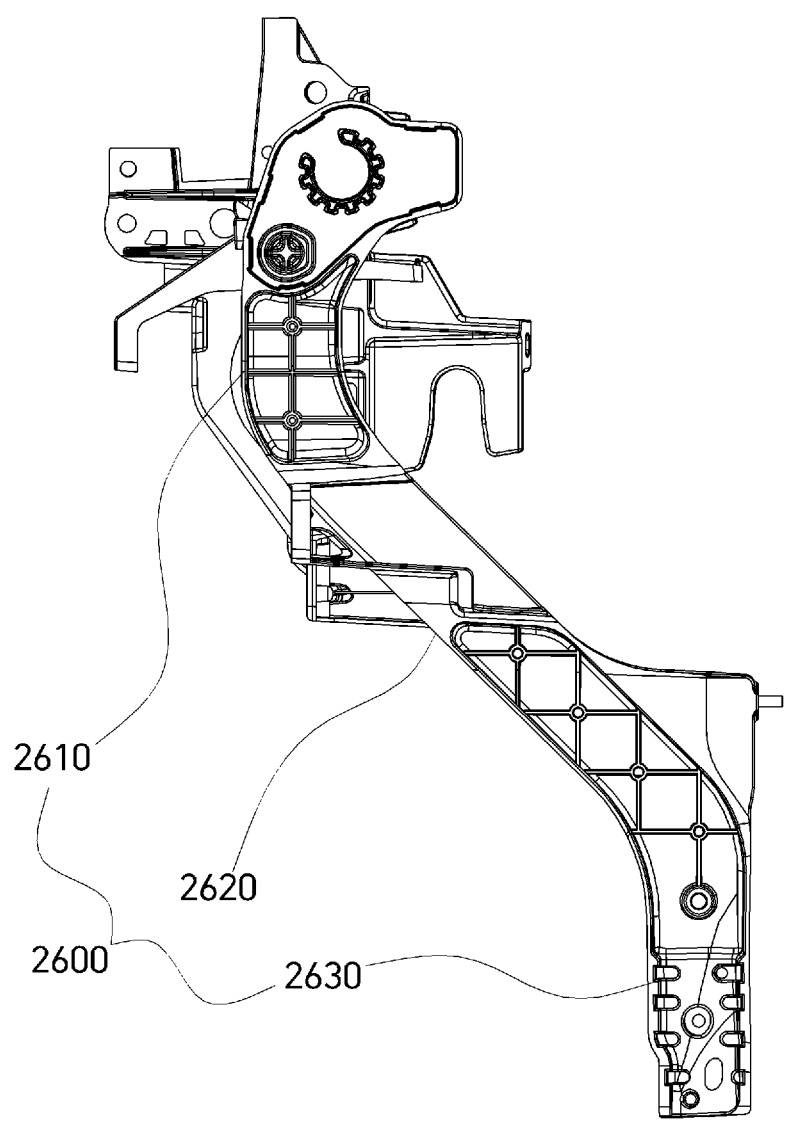
FIG. 30 is a side view showing the center support into which the second pipe included in the cowl cross bar assembly shown in FIG. 28 is inserted.

FIG. 28 is a perspective view showing the cowl cross bar assembly according to the third embodiment, FIG. 29 is a front view showing a center support into which a second pipe included in the cowl cross bar assembly shown in FIG. 28 is inserted, and FIG. 30 is a side view showing the center support into which the second pipe included in the cowl cross bar assembly shown in FIG. 28 is inserted.

Referring to FIGS. 28 and 30, the cowl cross bar assembly according to the third embodiment includes a pipe 2100 fixed to the interior of the vehicle in a lateral direction, pipe caps fitting on both ends of the pipe 2100, side brackets 2300 coupled to the pipe caps through insert-injection molding, pin members coupled to the side brackets 2300, a dash mounting member fixed to the pipe 2100, and a center support 2600.

Hereinafter, only the center support 2600, which has differences from those of the cowl cross bar assemblies according to the first embodiment and the second embodiment, will be described for sake of brevity.

The center support 2600 according to the third embodiment is configured to improve NVH performance of the vehicle, and one end thereof is disposed between a first pipe 2110 and a second pipe 2120 and the other end is fixed to the dash panel of the chassis to support vertical vibrations of the pipe 2100.

The center support 2600 includes a first vertical portion 2610, an intermediate portion 2620, a second vertical portion 2630, a stiffening portion 2640, a side bracket connection portion 2650, and a support frame 2660.

The first vertical portion 2610 extends in a first direction perpendicular to a longitudinal direction of the second pipe 2120.

Here, the first direction is a downward direction.

The intermediate portion 2620 connects ends of a first vertical portion 2610 and the second vertical portion 2630 to each other.

The intermediate portion 2620 extends in a second direction that meets the first direction at a certain angle.

The second vertical portion 2630 extends from an end of the intermediate portion 2620 in the first direction.

Accordingly, the intermediate portion 2620 of the center support 2600 has a bent shape.

The first vertical portion 2610 is disposed between the first pipe 2110 and the second pipe 2120.

An insertion hole, into which the second pipe 2120 is inserted, is formed in a top end of the first vertical portion 2610.

In a front view, the intermediate portion 2620 has a shape bent toward the front passenger's seat according to a layout of the vehicle in which a console area is reduced to secure an internal space of the vehicle.

In a side view, the intermediate portion 2620 has a shape bent toward the front of the vehicle according to the layout of the vehicle in which the console area is reduced to secure the internal space of the vehicle.

An end of the second vertical portion 2630 is fixedly coupled to the dash panel using a bolt member.

An upper space is formed above between the first vertical portion 2610 and the second vertical portion 2630 and a lower space is formed below therebetween.

The stiffening portion 2640 is formed in the upper space between the first vertical portion 2610 and the second vertical portion 2630 and fills the upper space.

The stiffening portion 2640 extends in the first direction perpendicular to the longitudinal direction of the second pipe 2120 and is formed over a side surface of the first vertical portion 2610 and a side surface of the intermediate portion 2620.

The stiffening portion 2640 meets the second pipe 2120 at the right angle and is parallel to the second vertical portion 2630 when viewed from the front of the vehicle.

An overall shape of the stiffening portion 2640 may be, for example, a parallelogram.

One end of the stiffening portion 2640 is fixed to the second pipe 2120, and the other end thereof is fixed to the end of the intermediate portion 2620 from which the second vertical portion 2630 extends downward.

Accordingly, the stiffening portion 2640 may prevent or reduce sagging of the second pipe 2120 as well as further improve vertical stiffness of the center support 2600 having a tilted shape according to a layout of the interior of the vehicle.

The stiffening portion 2640 includes a stiffening support portion 2641, a stiffening rib 2642, and a connection rib 2643.

A pair of such stiffening support portions 2641 are spaced at a distance apart from the first vertical portion 2610 in a longitudinal direction of the pipe 2100 and are parallel to the first vertical portion 2610.

The stiffening support portion 2641 and the intermediate portion 2620 may have a shape tilted toward the front of the vehicle when viewed from the side of the vehicle.

The stiffening support portion 2641 includes a first stiffening support portion 2641_1 disposed to be adjacent to the first vertical portion 2610 and a second stiffening support portion 2641_2 spaced apart from the first stiffening support portion 2641_1.

The first stiffening support portion 2641_1 extends from the second pipe 2120 in the first direction and is fixed to a middle area of the intermediate portion 2620.

Also, the second stiffening support portion 2641_2 is spaced apart from the first stiffening support portion 2641_1 in the longitudinal direction of the second pipe 2120 and extends downward from the second pipe 2120 to be fixed to an end of the intermediate portion 2620.

Accordingly, the stiffening support portion 2641 includes the first stiffening support portion 2641_1 and the second stiffening support portion 2641_2 and doubly supports an impact vertically applied to the center support 2600 so that the vertical stiffness of the center support 2600 may be further increased.

The stiffening rib 2642 supports the first stiffening support portion 2641_1 and the second stiffening support portion 2641_2 and is formed between the first stiffening support portion 2641_1 and the second stiffening support portion 2641_2.

One end of the stiffening rib 2642 is fixed to the other surface of the first stiffening support portion 2641_1, and the other end thereof is fixed to one surface of the second stiffening support portion 2641_2.

A plurality of such stiffening ribs 2642 are disposed between the first stiffening support portion 2641_1 and the second stiffening support portion 2641_2 to be spaced at distances apart from each other along a vertical direction.

Accordingly, when the stiffening support portion 2641 supports a vertical impact to the center support 2600, the stiffening ribs 2642 may effectively prevent or reduce the first stiffening support portion 2641_1 and the second stiffening support portion 2641_2 from being bent in a direction facing each other or effectively prevent or reduce damage.

The connection rib 2643 is configured to fix the stiffening support portion 2641 to the first vertical portion 2610 and is formed between the first vertical portion 2610 and the stiffening support portion 2641.

One end of the connection rib 2643 is fixed to the other surface of the first vertical portion 2610, and the other end thereof is fixed to one surface of the stiffening support portion 2641.

A plurality of such connection ribs 2643 are disposed between the first vertical portion 2610 and the first stiffening support portion 2641_1 to be spaced at distances apart from each other in a vertical direction.

Accordingly, the connection ribs 2643 may allow the stiffening support portion 2641 to be firmly fixed to the first vertical portion 2610.

The side bracket connection portion 2650 is disposed between the stiffening portion 2640 and the side bracket 2300.

The side bracket connection portion 2650 surrounds an outer circumferential surface of the second pipe 2120 and connects the stiffening portion 2640 to the side bracket 2300.

The side bracket connection portion 2650, the stiffening portion 2640, and the side bracket 2300 may be integrally formed.

Also, the side bracket connection portion 2650 and the stiffening portion 2640 may include polypropylene and glass fiber like the side bracket 2300.

Further, a plurality of grooves may be formed in an outer circumferential surface of the side bracket connection portion 2650.

Accordingly, the side bracket connection portion 2650 may significantly reduce an overall weight of the cowl cross bar assembly and may reduce broken pieces of the side bracket connection portion 2650 that is damaged when a head-on collision of the vehicle occurs so as to reduce an amount of injury to a passenger caused by the broken pieces.

The support frame 2660 is configured to support a glove box and is formed from the side bracket connection portion 2650 to an area in which the glove box of the vehicle is disposed.

The support frame 2660 is fixed to the side bracket connection portion 2650 and the side bracket 2300.

The support frame 2660 includes a first frame 2661 and a second frame 2662.

The first frame 2661 extends in the first direction perpendicular to a middle area of the side bracket connection portion 2650.

Here, the first direction is a downward direction.

The second frame 2662 horizontally extends from an end of the first frame 2661 to a direction in which the side bracket 2300 is disposed.

The second frame 2662 connects the end of the first frame 2661 to an end of the side bracket 2300.

The first frame 2661 and the second frame 2662 may be integrally formed with the side bracket connection portion 2650 and the side bracket 2300.

The support frame 2660 has, for example, an overall quadrangular space when viewed from the front of the vehicle.

Also, the glove box of the vehicle is disposed in the quadrangular space and is assembled to the support frame 2660.

The support frame 2660 may have a variety of shapes according to the layout of the interior of the vehicle.

Also, a center support according to a fourth embodiment of the present invention may absorb impact energy applied from the front of the vehicle.

Hereinafter, a center support of a cowl cross bar assembly according to another embodiment will be described below in detail.

Figure 31:
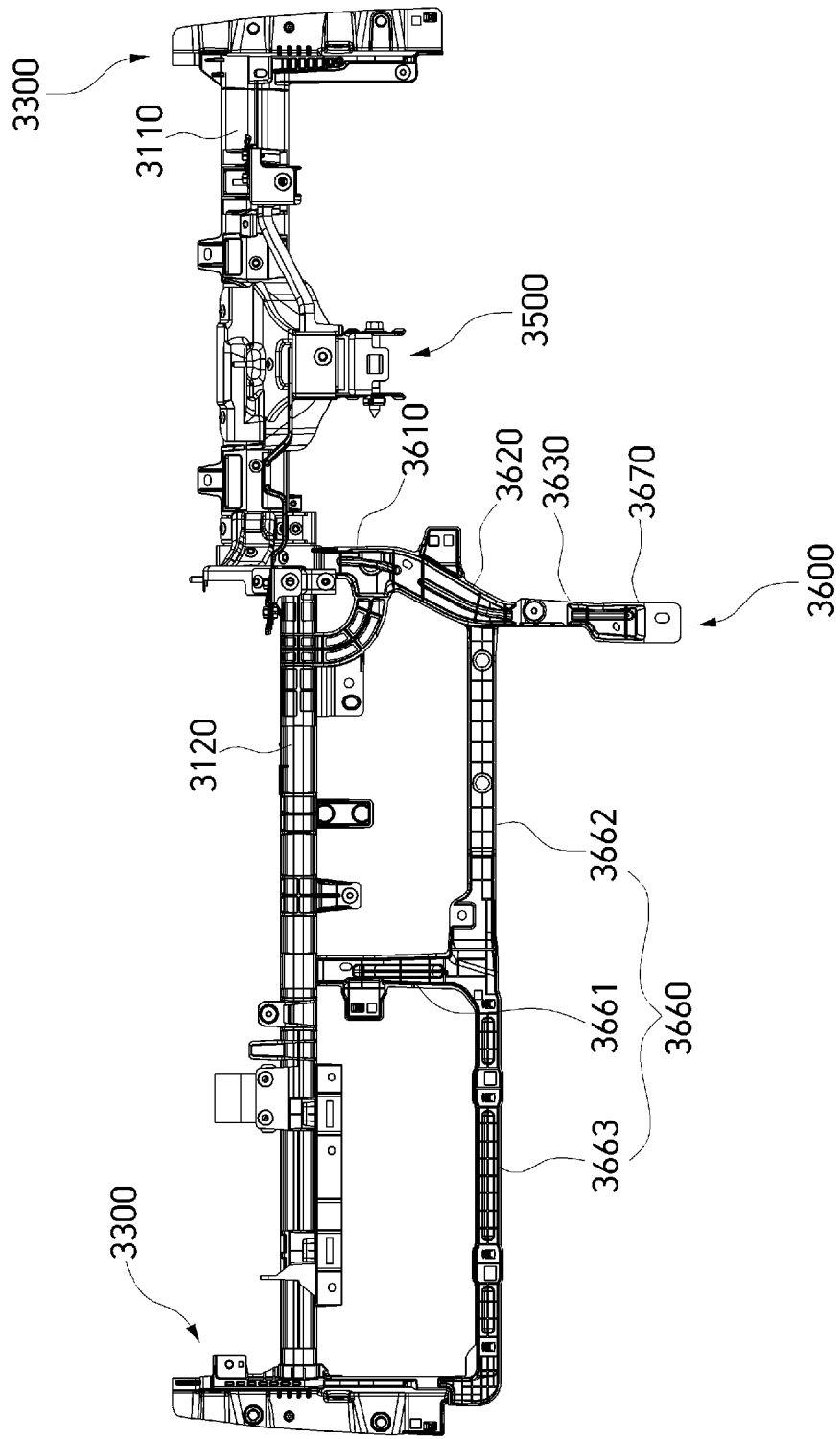
FIG. 31 is a front view showing a cowl cross bar assembly according to a fourth embodiment.
Figure 32:
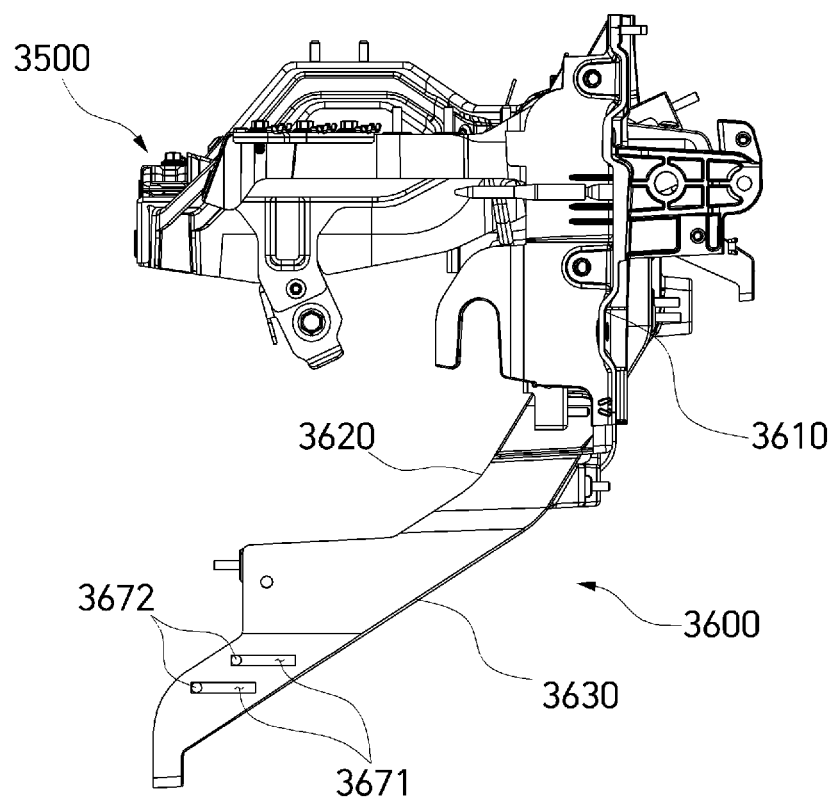
FIGS. 32 and 33 are operational views showing a second vertical portion and a lower bracket of the cowl cross bar assembly according to the fourth embodiment.
Figure 33:
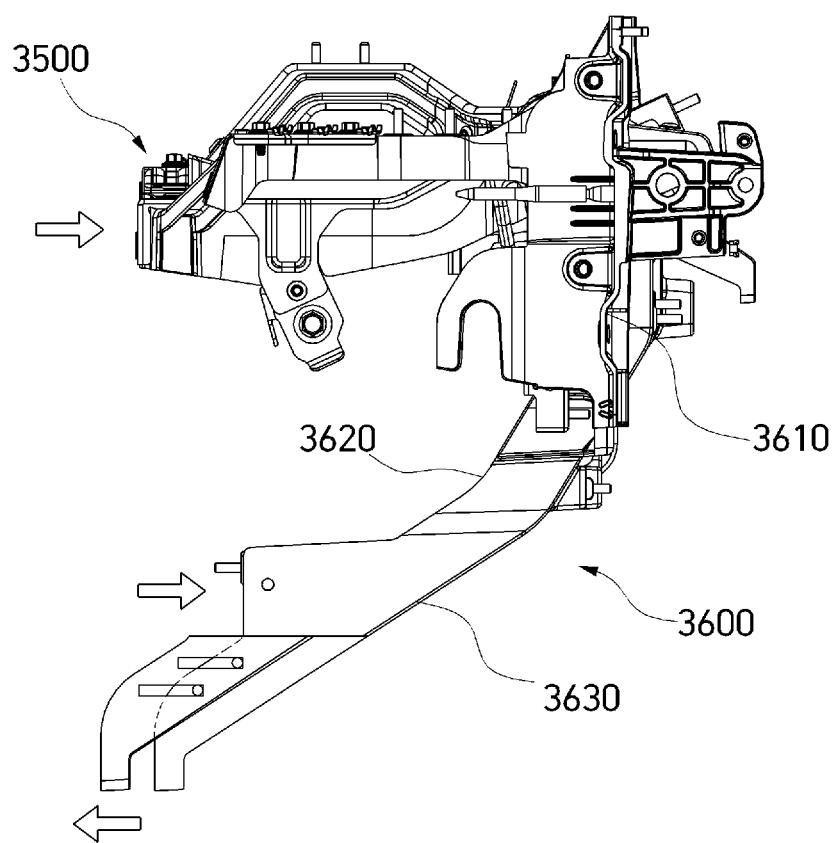

FIG. 31 is a front view showing a cowl cross bar assembly according to the fourth embodiment, and FIGS. 32 and 33 are operational views showing a second vertical portion and a lower bracket of the cowl cross bar assembly according to the fourth embodiment.

Referring to FIGS. 31 and 33, the cowl cross bar assembly according to the fourth embodiment of the present invention includes a pipe 3100 fixed to the interior of the vehicle in a lateral direction, pipe caps fitting on both ends of the pipe 3100, side brackets 3300 coupled to the pipe caps through insert-injection molding, pin members coupled to the side brackets 3300, a dash mounting member fixed to the pipe 3100, and a center support 3600.

Hereinafter, only the center support 3600, which has differences from the center supports of the cowl cross bar assemblies according to the first embodiment, the second embodiment, and the third embodiment, will be described for sake of brevity.

The center support 3600 according to the fourth is configured to improve NVH performance of the vehicle, and one end thereof is disposed between a first pipe 3110 and a second pipe 3120 and the other end is fixed to the dash panel of the chassis to support vertical vibrations of the pipe 3100.

The center support 3600 includes a first vertical portion 3610, an intermediate portion 3620, a second vertical portion 3630, a stiffening portion 3640, a side bracket connection portion 3650, a support frame 3660, and a lower bracket 3670.

The first vertical portion 3610 extends in a first direction perpendicular to a longitudinal direction of the second pipe 3120.

Here, the first direction is a downward direction.

The first vertical portion 3610 is disposed between the first pipe 3110 and the second pipe 3120 and divides an area of the driver's seat from an area of the front passenger's seat.

The intermediate portion 3620 is disposed between the first vertical portion 3610 and the second vertical portion 3630 and connects ends of the first vertical portion 3610 and the second vertical portion 3630 to each other.

The intermediate portion 3620 extends in a second direction which meets the first direction at a certain angle.

In a front view, the intermediate portion 3620 has a shape bent toward the front passenger's seat according to a layout of the vehicle in which a console area is reduced to secure an internal space of the vehicle.

The second vertical portion 3630 extends from an end of the intermediate portion 3620 in the first direction.

Accordingly, in the center support 3600, the intermediate portion 3620 thereof has a bent shape and the first vertical portion 3610 and the second vertical portion 3630 are spaced apart from each other in a longitudinal direction of the second pipe 3120.

An end of the second vertical portion 3630 is fixedly coupled to the dash panel using a bolt member.

The stiffening portion 3640 extends in the first direction perpendicular to the longitudinal direction of the second pipe 3120.

Here, the first direction is a downward direction.

The stiffening portion 3640 meets the second pipe 3120 at the right angle and is parallel to the second vertical portion 3630 when viewed from the front of the vehicle.

The stiffening portion 3640 is formed at a position spaced at a distance apart from the first vertical portion 3610 in the longitudinal direction of the second pipe 3120.

One end of the stiffening portion 3640 is fixed to the second pipe 3120, and the other end is bent toward the first vertical portion 3610 while forming a curve to be fixed to an end of the first vertical portion 3610.

Accordingly, the stiffening portion 3640 may firmly prevent or reduce sagging of the second pipe 3120.

The side bracket connection portion 3650 is disposed between the first vertical portion 3610 and the side bracket 3300 and connects the first vertical portion 3610 to the side bracket 3300.

The side bracket connection portion 3650, the first vertical portion 3610, and the side bracket 3300 may be integrally formed.

The side bracket connection portion 3650 surrounds an outer circumferential surface of the second pipe 3120.

Also, the side bracket connection portion 3650 and the first vertical portion 3610 may include polypropylene and glass fiber like the side bracket 3300.

The support frame 3660 is configured to support a car audio and a glove box and is formed from the side bracket connection portion 3650 to an area in which the car audio and the glove box of the vehicle are disposed.

The support frame 3660 is fixed to the end of the intermediate portion 3620, the side bracket connection portion 3650, and the side bracket 3300.

The support frame 3660 includes a first frame 3661, a second frame 3662, and a third frame 3663.

The first frame 3661 extends from a middle area of the side bracket connection portion 3650 in the first direction perpendicular thereto.

Here, the first direction is a downward direction.

The second frame 3662 horizontally extends from an end of the first frame 3661 in a direction, in which the intermediate portion 3620 is disposed, and connects the end of the first frame 3661 to a middle area of the intermediate portion 3620.

The first frame 3661 and the second frame 3662 may be integrally formed with the intermediate portion 3620 and the side bracket connection portion 3650.

The car audio and the like are assembled to the first frame 3661 and the second frame 3662.

The third frame 3663 horizontally extends from the end of the first frame 3661 in a direction, in which the side bracket 3300 is disposed, and connects the end of the first frame 3661 to an end of the side bracket 3300.

The third frame 3663 and the first frame 3661 are integrally formed with the side bracket connection portion 3650 and the side bracket 3300.

The glove box is assembled to the first frame 3661 and the third frame 3663.

The lower bracket 3670 is formed of a panel having a certain horizontal length.

One end of the lower bracket 3670 is fixed to a bottom of the second vertical portion 3630, and the other end thereof is fixed to the dash panel.

Accordingly, the bottom of the second vertical portion 3630 is fixed to the dash panel indirectly.

A buffering groove 3671 formed of a long horizontal groove is formed in the lower bracket 3670.

A buffering protrusion 3672 is formed on the bottom of the second vertical portion 3630 at a position corresponding to the buffering groove 3671.

The buffering protrusion 3672 is coupled to the buffering groove 3671 and fixes the lower bracket 3670 to the second vertical portion 3630.

The buffering protrusion 3672 may be coupled to the buffering groove 3671 using a bolt-coupling method.

The buffering protrusion 3672 is fixed to one end of the buffering groove 3671 formed of a long horizontal groove toward the front of the vehicle.

Also, when a head-on collision accident of the vehicle occurs, as shown in FIG. 33, the pipe 3100, the dash mounting member 3500, and the first vertical portion 3610 move toward a rear of the vehicle. Simultaneously, the buffering protrusion 3672 of the second vertical portion 3630 moves in the buffering groove 3671 toward the other end of the buffering groove 3671 toward the rear of the vehicle along a moving direction of the second vertical portion 3630.

Accordingly, when collision energy is transferred from a frontward direction to the first vertical portion 3610 through the dash mounting member 3500 in the head-on collision of the vehicle, the lower bracket 3670 allows the second vertical portion 3630 to be pushed backward.

Accordingly, when a collision accident of the vehicle occurs, the lower bracket 3670 effectively buffers the collision energy applied to the pipe 3100, the dash mounting member 3500, the first vertical portion 3610, and the like so as to prevent or reduce a coupling structure of the lower bracket 3670 and the second vertical portion 3630 from being damaged.

Particularly, when the lower bracket 3670 pushes the second vertical portion 3630 to be pushed backward, the cowl cross bar assembly may be prevented or reduced from being excessively rotated so as to minimize displacement of a steering column coupled to the dash mounting member 3500.

Also, in the collision accident of the vehicle, even when the collision energy is generated so that the coupling structure of the lower bracket 3670 and the second vertical portion 3630 are damaged, the collision energy may be compensated for already while the buffering protrusion 3672 moves from one end to the other end of the buffering groove 3671 so as to minimize excessive rotation of the cowl cross bar assembly.

As described above, the cowl cross bar assembly according to one or more embodiments may use materials such as an injection-molded compound such as aluminum, magnesium, plastic, and the like that are relatively lighter than metallic material as well as increase overall strength of the cowl cross bar.

Also, since a plurality of pipe stiffeners having different levels of stiffness are provided, it is possible to easily adjust a section that needs stiffness and a section that needs flexibility in a pipe and to reduce manufacturing costs of the pipe stiffeners by preventing an unnecessarily excessive amount of energy absorbing foam from being used.

Also, stiffness of the pipe may be adjusted for each section through a winding process of winding a winding material on an outer circumferential surface of the pipe.

In addition, when a collision accident of a vehicle occurs, a second extension portion inserted into both ends of the pipe may support both ends of the pipe by as much as an extended length of the second extension portion so as to absorb collision energy transferred to the pipe coupled through insert-injection molding method and to increase stiffness of both ends of the pipe.

Also, a dash mounting stiffener may be disposed on the dash mounting member so as to secure stiffness against a collision and the like of the vehicle with the dash mounting member to minimize collision energy transferred to the dash mounting member.

Also, a mounting connection bracket connected to the dash mounting member may meet a support connection bracket at the right angle so as to supplement vertical stiffness of a first vertical portion, which is tilted, and to improve NVH performance.

In addition, when viewed from a front of the vehicle, a stiffening portion and a center support may meet the pipe at the right angle and the stiffening portion may be formed to be linear with a second vertical portion so as to prevent or reduce sagging of the pipe and further improve vertical stiffness of the center support.

Also, a buffering protrusion is fixed to one end of a buffering groove formed of a horizontal long groove toward a rear of the vehicle. When a head-on collision accident of the vehicle occurs, a lower bracket may move toward the rear of the vehicle and the buffering protrusion may move toward the other end toward the front of the vehicle so as to effectively buffer collision energy applied to the pipe, the dash mounting member, the center support, and the like. Accordingly, a coupling structure of the lower bracket and the second vertical portion may be prevented from being damaged. Particularly, the cowl cross bar assembly may be prevented from being excessively rotated so as to minimize displacement of a steering column coupled to the dash mounting member.

According to one or more embodiments, a cowl cross bar assembly has effects of using materials such as an injection-molded compound such as aluminum, magnesium, plastic, and the like that are relatively lighter than metallic material as well as increasing overall strength of the cowl cross bar.

Also, since a plurality of pipe stiffeners having different levels of stiffness are provided to easily adjust a section that needs stiffness and a section that needs flexibility in a pipe and to prevent an unnecessarily excessive amount of energy absorbing foam from being used, there is an effect of reducing manufacturing costs of the pipe stiffeners.

Also, there is an effect of adjusting stiffness of the pipe for each section through a winding process of winding a winding material on an outer circumferential surface of the pipe.

In addition, since when a collision accident of a vehicle occurs, a second extension portion inserted into both ends of the pipe may support both ends of the pipe by as much as an extended length of the second extension portion, there are effects of absorbing collision energy transferred to the pipe coupled through insert-injection molding method and increasing stiffness of both ends of the pipe.

Also, since a dash mounting stiffener may be disposed on the dash mounting member so as to secure stiffness against a collision and the like of the vehicle with the dash mounting member, there is an effect of minimizing collision energy transferred to the dash mounting member.

Also, since a mounting connection bracket connected to the dash mounting member meets a support connection bracket at the right angle, there are effects of supplementing vertical stiffness of a first vertical portion, which is tilted, and improving NVH performance.

In addition, when viewed from a front of the vehicle, a stiffening portion and a center support meet the pipe at the right angle and the stiffening portion is formed to be linear with a second vertical portion, and thus there are effects of preventing sagging of the pipe and further improving vertical stiffness of the center support.

Also, a buffering protrusion is fixed to one end of a buffering groove formed of a horizontal long groove toward a rear of the vehicle. When a head-on collision accident of the vehicle occurs, a lower bracket may move toward the rear of the vehicle and the buffering protrusion may move toward the other end toward the front of the vehicle so as to effectively buffer collision energy applied to the pipe, the dash mounting member, the center support, and the like. Accordingly, there is an effect of preventing a coupling structure of the lower bracket and the second vertical portion from being damaged. Particularly, there is an effect of preventing the cowl cross bar assembly from being excessively rotated so as to minimize displacement of a steering column coupled to the dash mounting member.

Although embodiments have been shown and described hereinabove, the present invention is not limited to specific embodiments described above, but may be various modified by those skilled in the art to which the present invention pertains without departing from the scope of the disclosure as disclosed in the accompanying claims. In addition, such modifications should also be understood to fall within the scope of the present invention.

What is claimed is:

1. A cowl cross bar assembly comprising:
    a first pipe and a second pipe which are hollow and disposed laterally inside a chassis;
    a dash mounting member disposed between both ends of the first pipe; and
    a pipe stiffener disposed in the first and second pipe, the pipe stiffener comprising energy-absorbing foam and having a cross-section that is a same shape as a cross-section of the first and second pipes,
    wherein the dash mounting member is attached to the first pipe and comprises:
    a dash mounting stiffener;
    a polyhedral-shaped case including an internal space in which the dash mounting stiffener is received; and
    a stiffening plate covering a top surface of the case, the case comprising a dash mounting coupling portion to which the first pipe is inserted,
    wherein the stiffener has the same polyhedral cube shape as the dash mounting member,
    wherein the stiffening plate includes a top surface stiffening plate and a front surface stiffening plate, and
    wherein the top surface stiffening plate seals the open top of the case, and the front surface stiffening plate is disposed on the front of the case.

2. The cowl cross bar assembly of claim 1, wherein a stiffening plate formed of metallic material is coupled to at least one surface of the dash mounting member.

3. The cowl cross bar assembly of claim 2, wherein the at least one surface of the dash mounting member comprises a top surface and a front surface.

4. The cowl cross bar assembly of claim 1, wherein the dash mounting stiffener comprises polypropylene, polyurethane, or a combination thereof.

5. The cowl cross bar assembly of claim 1, further comprising a first pipe cap configured to be fitted onto one end of the first pipe further away from the second pipe.

6. The cowl cross bar assembly of claim 5, further comprising a second pipe cap configured to be fitted onto one end of the second pipe furthest away from the first pipe.

7. A cowl cross bar assembly comprising:
a first pipe and a second pipe which are hollow and disposed laterally inside a chassis;
a dash mounting member disposed between both ends of the first and second pipes; and
a pipe stiffener disposed in the first and second pipe, the pipe stiffener comprising energy-absorbing foam and having a cross-section that is a same shape as a cross-section of the first and second pipes,
wherein the dash mounting member is attached to the first and second pipes, the dash mounting member comprising a dash mounting stiffener accommodated in the dash mounting member, and
wherein the dash mounting stiffener has a same polyhedral cube shape as the dash mounting member.

8. The cowl cross bar assembly of claim 7, wherein the dash mounting member has a band shape when viewed from above.

9. The cowl cross bar assembly of claim 7, wherein a stiffening plate formed of metallic material is coupled to at least one surface of the dash mounting member.

10. The cowl cross bar assembly of claim 7, wherein the at least one surface of the dash mounting member comprises a top surface and a front surface.

11. The cowl cross bar assembly of claim 7, wherein the dash mounting stiffener comprises polypropylene, polyurethane, or a combination thereof.

12. The cowl cross bar assembly of claim 7, further comprising a first pipe cap configured to be fitted onto one end of the first pipe further away from the second pipe.

* * * * *